(12) United States Patent
Lee

(10) Patent No.: US 11,704,068 B2
(45) Date of Patent: Jul. 18, 2023

(54) APPARATUS AND METHOD FOR SCHEDULING OPERATIONS PERFORMED IN PLURAL MEMORY DEVICES INCLUDED IN A MEMORY SYSTEM

(71) Applicant: SK hynix Inc., Gyeonggi-do (KR)

(72) Inventor: Ji Hoon Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/461,381

(22) Filed: Aug. 30, 2021

(65) Prior Publication Data

US 2022/0317931 A1 Oct. 6, 2022

(30) Foreign Application Priority Data

Mar. 31, 2021 (KR) ........................ 10-2021-0041916

(51) Int. Cl.
*G06F 3/06* (2006.01)
(52) U.S. Cl.
CPC .......... *G06F 3/0659* (2013.01); *G06F 3/0604* (2013.01); *G06F 3/0613* (2013.01); *G06F 3/0631* (2013.01); *G06F 3/0656* (2013.01); *G06F 3/0688* (2013.01)
(58) Field of Classification Search
CPC .... G06F 3/0659; G06F 3/0604; G06F 3/0631; G06F 3/0656

USPC ........................................................ 711/154
See application file for complete search history.

(56) References Cited

U.S. PATENT DOCUMENTS

| | | | |
|---|---|---|---|
| 9,496,006 B2 * | 11/2016 | Doering | G06F 12/00 |
| 2018/0136840 A1 * | 5/2018 | Ouyang | G06F 3/0688 |
| 2018/0307597 A1 * | 10/2018 | Oh | G06F 12/0246 |
| 2019/0073139 A1 * | 3/2019 | Kim | G06F 3/0659 |
| 2019/0265911 A1 * | 8/2019 | Yoo | G06F 3/0679 |
| 2019/0294342 A1 * | 9/2019 | Emma | G06F 3/0685 |
| 2020/0042191 A1 * | 2/2020 | Shulman | G06F 13/1647 |
| 2020/0117378 A1 * | 4/2020 | Hsu | G06F 3/0619 |
| 2022/0283725 A1 * | 9/2022 | Kim | G06F 3/0679 |

FOREIGN PATENT DOCUMENTS

| | | |
|---|---|---|
| KR | 1020170011350 A | 2/2017 |
| KR | 1020190027677 A | 3/2019 |

* cited by examiner

*Primary Examiner* — Than Nguyen
(74) *Attorney, Agent, or Firm* — IP & T Group LLP

(57) ABSTRACT

A memory system includes a plurality of memory groups capable of performing a data input/output operation, and a controller configured to divide an operation subject to a data input/output command into at least one unit operation corresponding to the plurality of memory groups, and assign the at least one unit operation to plural queues corresponding to the respective memory groups, based on first information regarding operation statuses of the plurality of memory groups and second information regarding available resources.

17 Claims, 9 Drawing Sheets

APPARATUS AND METHOD FOR SCHEDULING OPERATIONS PERFORMED IN PLURAL MEMORY DEVICES INCLUDED IN A MEMORY SYSTEM

CROSS-REFERENCE TO RELATED APPLICATIONS

This patent application claims the benefit of Korean Patent Application No. 10-2021-0041916, filed on Mar. 31, 2021, the entire disclosure of which is incorporated herein by reference.

TECHNICAL FIELD

Embodiments of the present disclosure described herein relate to a memory system, and particularly, to an apparatus and method for scheduling operations performed in the memory system.

BACKGROUND

Recently, a paradigm for a computing environment has shifted to ubiquitous computing, which enables computer systems to be accessed virtually anytime and anywhere. As a result, the use of portable electronic devices (e.g., mobile phones, digital cameras, notebook computers, or the like) is rapidly increasing. Such portable electronic devices each may use or include a memory system having at least one memory device. The memory system may be a data storage device. The data storage device can be used as a main storage device or an auxiliary storage device of a portable electronic device.

Unlike a hard disk, such a data storage device uses non-volatile semiconductor memories, exhibits improved stability and durability, has no mechanical driving parts (e.g., a mechanical arm), and thus provides high data access speeds and relatively low power consumption. Examples of the data storage device having such advantages include, but are not limited to, Universal Serial Bus (USB) memory devices, memory cards having various interfaces, solid state drives (SSDs), and so on.

BRIEF DESCRIPTION OF THE DRAWINGS

The description herein makes reference to the accompanying drawings wherein like reference numerals refer to like parts throughout the figures.

DETAILED DESCRIPTION

Figure 1:
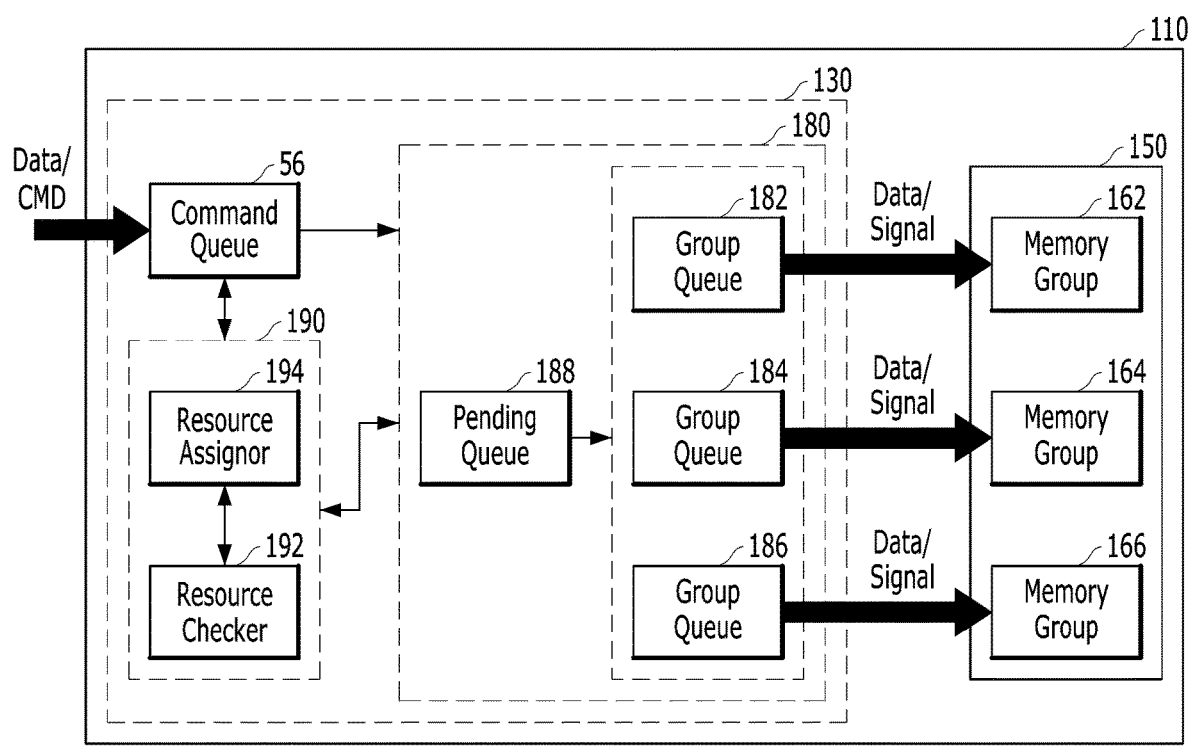
FIG. 1 illustrates a memory system according to an embodiment of the present disclosure.

Various embodiments of the present disclosure are described below with reference to the accompanying drawings. Elements and features of the disclosure, however, may be configured or arranged differently to form other embodiments, which may be variations of any of the disclosed embodiments.

In this disclosure, references to various features (e.g., elements, structures, modules, components, operations, characteristics, etc.) included in "one embodiment," "example embodiment," "an embodiment," "another embodiment," "some embodiments," "various embodiments," "other embodiments," "alternative embodiment," and the like are intended to mean that any such features may be included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components (e.g., an interface unit, circuitry, etc.).

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational (e.g., is not turned on nor activated). The block/unit/circuit/component used with the "configured to" language include hardware—for example, circuits, memory storing program instructions executable to implement the operation, etc. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

As used in this disclosure, the term 'circuitry' or 'logic' refers to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) circuits, such as a microprocessor(s) or a portion of a microprocessor(s), that require software or firmware for operation, even if the software or firmware is not physically present. This definition of 'circuitry' or 'logic' applies to all uses of this term in this application, including in any claims. As a further example, as used in this application, the term "circuitry" or "logic" also covers an implementation of merely a processor (or multiple processors) or portion of a processor and its (or their) accompanying software and/or firmware. The term "circuitry" or "logic" also covers, for example, and if applicable to a particular claim element, an integrated circuit for a storage device.

As used herein, the terms "first," "second," "third," and so on are used as labels for nouns that they precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Herein, an item of data, a data item, a data entry or an entry of data may be a sequence of bits. For example, the data item may include the contents of a file, a portion of the file, a page in memory, an object in an object-oriented program, a digital message, a digital scanned image, a part of a video or audio signal, metadata or any other entity which can be represented by a sequence of bits. According to an embodiment, the data item may include a discrete object. According to another embodiment, the data item may include a unit of information within a transmission packet between two different components.

An embodiment of the disclosure can provide a data processing system and a method for operating the data processing system. The data processing system includes components and resources such as a memory system and a host, and is capable of dynamically allocating plural data paths used for data communication between the components based on usages of the components and the resources.

In addition, an embodiment of the present disclosure can provide an apparatus and a method for assigning data input/output operations to a plurality of memory groups based on first information regarding resources available in a memory system and second information regarding operations being performed or scheduled in the plurality of memory groups to improve data input/output performance of the memory system.

A controller in the memory system can divide a task, which corresponds to a data input/output-related command input from an external device, into unit operations corresponding to memory groups. Each memory group is capable of independently performing a data input/output-related operation in an interleaving mode. The controller can assign the unit operations to the memory groups. In a process of assigning the unit operations to the memory groups, the controller is configured to determine whether to assign the unit operations or change an assignment order of the unit operations, based on available resource information.

According to an embodiment of the present disclosure, the controller in the memory system can determine different weights for unit operations, according to a type of the unit operations related to data input/output, to score operations being performed or scheduled in each memory group. The controller can be configured to assign the unit operations to each memory group when resources available in each memory group can be used for the unit operations. Further, the controller can avoid a situation where the unit operations are tendentiously assigned to a specific memory group until the specific memory group could not perform additional unit operations. Thus, the controller can control assignment of unit operations within a capability range of each memory group to improve operational safety of the memory system. In addition, because the controller can score an operational burden of each memory group based on digitization regarding a processing speed, processing time, or etc. of unit operations being performed or scheduled in each memory group, the controller can easily change or adjust an execution sequence of unit operations performed by the plurality of memory groups.

In an embodiment, a memory system can include a plurality of memory groups capable of performing a data input/output operation; and a controller configured to divide an operation subject to a data input/output command into at least one unit operation corresponding to the respective memory groups, and assign the at least one unit operation to plural queues corresponding to the plurality of memory groups, based on first information regarding operation statuses of the plurality of memory groups and second information regarding available resources.

The controller can be further configured to determine the first information based on at least one first unit operation being performed in the plurality of memory groups and at least one second unit operation assigned to the plurality of memory groups.

The controller can determine the first information by assigning different weights to the at least one first unit operation and the at least one second unit operation according to a type of unit operation, scoring operational burdens for the respective memory groups based on the weights assigned to the at least one first unit operation and the at least one second unit operation, and comparing scored operational burdens with a reference.

Each of the plurality of memory groups can include plural non-volatile memory cells storing a data item and a buffer memory for temporarily storing the data item. Each of the plurality of memory groups can independently perform the at least one unit operation in an interleaving mode.

The controller can be configured to adjust or change an assignment sequence of the at least one unit operation, based on the first information and the second information, before assigning the at least one unit operation to the plural queues.

Each of the plural queues can correspond to each of the plurality of memory groups. The controller can further include a pending queue which is distinguishable from the plural queues.

The controller can be further configured to allocate at least one resource for the at least one unit operation. When a quantity of unit operations is greater than a quantity of resources, the controller can be configured to assign the at least one unit operation to the pending queue, not the plural queues.

The quantity of resources can be equal to a quantity of metadata for data input/output, which is allocated by a flash translation layer or a flash interface layer included in the controller.

The quantity of resources can be equal to a quantity of threads which the controller is capable of controlling.

In another embodiment, a method for operating a memory system can include dividing an operation subject to a data input/output command into at least one unit operation corresponding to a plurality of memory groups; determining first information regarding operation statuses of the plurality of memory groups based on at least one first unit operation being performed in the plurality of memory groups and at least one second unit operation assigned to the plurality of memory groups; and assigning the at least one unit operation to plural queues corresponding to the plurality of memory groups based on second information regarding available resources and the first information.

The determining the first information can include assigning different weights to the at least one first unit operation and the at least one second unit operation according to a type of unit operation; scoring operational burdens for the respective memory groups based on the weights assigned to the at least one first unit operation and the at least one second unit operation; and comparing scored operational burdens with a reference.

The at least one unit operation can be independently performed by each of the plurality of memory groups in an interleaving mode.

The at least one unit operation might be unassigned to the plural queues when a quantity of unit operations is greater than a quantity of resources.

The method can further include assigning an unassigned unit operation to a pending queue.

The method can further include adjusting or changing an assignment sequence of the at least one unit operation, based on the first information and the second information, before assigning the at least one unit operation to the plural queues.

In another embodiment, a controller in communication with a plurality of memory groups, which is capable of performing a data input/output operation via plural data paths, the controller including at least one processor, at least one memory, and a logic, at least a portion of the logic included in hardware. The logic can be configured to establish, in the at least one memory, a first region for temporarily storing first operation data regarding an operation subject to a command input from an external device and a second region for temporarily storing second operation data regarding at least one first unit operation scheduled to be performed in the plurality of memory groups; and generate the second operation data from the first operation data, based on second information regarding available resources and first information regarding operation statuses of the plurality of memory groups.

The logic can be configured to determine the first information, based on at least one second unit operation being performed in the plurality of memory groups and at least one second unit operation of the second operation data stored in the second region.

The logic can determine the first information by assigning different weights to the at least one first unit operation and the at least one second unit operation according to a type of unit operation, scoring operational burdens for the respective memory groups based on the at least one first unit operation and the at least one second unit operation, and comparing scored operational burdens with a reference.

The logic can be further configured to establish, in the at least one memory, a third region for temporarily storing third operation data regarding at least one pending operation or at least one pending unit operation which is not included in the second operation data; and generate the third operation data from the first operation information, based on the first and second information.

The logic can be further configured to adjust or change a sequence of the second operation data or the third operation data, while generating the second operation data to be stored in the second region or the third operation data to be stored in the third region based on the first operation data stored in the first region.

In another embodiment, a memory system can include a memory device configured to perform, in response to an operation indicator, an operation independently on a corresponding one of first and second memory groups included therein; first to third queues each configured to queue operation indicators based on a first-in-first-out (FIFO) scheme, each of the first and second queues dequeuing the queued operation indicators to the memory device for the corresponding memory group; and a control component configured to enqueue each operation indicator into one of the first to third queues according to an available resource and statuses of the first and second memory groups, wherein the available resource is to be allocated for the operation of the operation indicator enqueued into one of the first and second queues, wherein the status represents the operation being performed on a corresponding memory group and the operation of the operation indicator queued in a corresponding one of the first and second queues, wherein the control component enqueues the operation indicator into the third queue when the available resource is insufficient to be allocated for the operation of the operation indicator or when the status of the corresponding memory group is greater than a threshold, and wherein the control component is further configured to dequeue, according to the available resource and the statuses, the operation indicator from the third queue to enqueue the dequeued operation indicator into the corresponding one of the first and second queues.

Embodiments of the present disclosure will now be described with reference to the accompanying drawings, wherein like numbers reference like elements.

FIG. 1 illustrates a memory system 110 according to an embodiment of the present disclosure.

Referring to FIG. 1, the memory system 110 may include a memory device 150 and a controller 130. The memory device 150 and the controller 130 may be physically separated from each other in the memory system 110. The memory device 150 and the controller 130 may be connected via at least one data path. For example, the data path may include a channel and/or a way. According to an embodiment, the memory device 150 and the controller 130 may be functionally divided. Further, according to an embodiment, the memory device 150 and the controller 130 may be implemented with a single chip or a plurality of chips.

The memory device 150 can include a plurality of memory groups 162, 164, 166. Herein, the plurality of memory groups 162, 164, 166 may be understood as a group, including non-volatile memory cells and independently performing a data input/output operation. For example, if a read operation is being performed in a first memory group 162, another read operation, a write operation, or an erase operation to be performed on the first memory group 162 is placed in a standby state. On the other hand, even while the read operation is being performed in the first memory group 162, the second memory group 164 or the third memory group 166 may independently perform another read operation, another write operation, or another erase operation.

According to an embodiment, each of the plurality of memory groups 162, 164, 166, independently performing the data input/output operation, can include a plurality of non-volatile memory cells for storing a data item, a buffer for temporarily storing the data item during the data input/output operation, and a voltage supply circuit 170 (refer to FIG. 2) for generating and supplying operating voltages having various levels for the data input/output operation in the plurality of non-volatile memory cells. For example, each of the plurality of memory groups 162, 164, 166 may include a memory plane or a memory die including at least one memory block 152, 154, 156 shown in FIG. 2. The memory block 152 may be understood as a group of non-volatile memory cells in which data is erased together during a single erase operation. The memory block 152 may include a plurality of pages. According to an embodiment, each page may be understood as a group of non-volatile memory cells in which data is stored together during a single program operation or read out together during a single read operation.

According to an embodiment, the memory plane may be considered a logical or a physical partition including at least one memory block 152, a driving circuit capable of controlling an array including a plurality of non-volatile memory cells, and a buffer that can temporarily store data to be input to the non-volatile memory cells or data output from non-volatile memory cells.

According to an embodiment, the memory die may include at least one memory plane. The memory die may be understood as a set of components implemented on a physically distinguishable substrate. Each memory die may be connected to the controller 130 through a data path. Each memory die may include an interface to exchange data and a signal with the controller 130.

According to an embodiment, the memory device 150 may include of the plurality of memory groups 162, 164, 166, including at least one memory block 152, at least one memory plane, or at least one memory die. The internal configuration of the memory device 150 shown in FIG. 1 may be changed according to performance of the memory system 110. Therefore, embodiments are not limited to the internal configuration shown in FIG. 1.

The controller 130 may perform a data input/output operation in response to a request input from the external device. For example, when the controller 130 performs a read operation in response to a read request input from the external device, data stored in a plurality of non-volatile memory cells included in the memory device 150 is transferred to the controller 130.

The controller 130 may use a memory 144 for the data input/output operation. For example, the controller 130 may temporarily store the data transferred from the memory device 150 in a memory 144 shown in FIG. 2 and FIG. 3. The controller 130 may output the data stored in the memory 144 to the external device in response to the read request.

Referring to FIG. 1, the controller 130 may establish a plurality of queues in the memory 144. Herein, a queue is a basic data structure in which data are enqueued and dequeued according to a first-in-first-out (FIFO) scheme. The queue can be understood as a finite ordered list in which only an insert operation (enqueue) is performed at one end (rear) and only a delete operation (dequeue) is performed at the other end (front). Because information or data stored in the queue is sequentially output, an output order could not be changed when a plurality of information or data is stored in the queue. The controller 130 can sequentially insert data items Data and commands CMD transferred from an external device (e.g., a host 102 shown in FIG. 2) into a command queue 56. If the controller 130 does not change an operation order of the commands CMD, the corresponding commands CMD are sequentially stored to an execution queue 180.

Herein, the execution queue 180 may include a plurality of group queues 182, 184, 186 and a pending queue 188. The plurality of group queues 182, 184, 186 can correspond one-to-one with the plurality of memory groups 162, 164, 166 in the memory device 150. The plurality of group queues 182, 184, 186 may sequentially store information or data regarding unit operations or tasks scheduled to be performed in the plurality of memory groups 162, 164, 166. At least one unit operation or task, which is not assigned to the plurality of group queues 182, 184, 186 and thus is pending, may be included in the pending queue 188.

A resource management component 190 in the controller 130 may change or adjust an execution order or sequence of operations subject to commands which are output from the command queue 56 and assigned to the execution queue 180. The resource management component 190 can determine first information (hereinafter, status information) regarding operation statuses of the plurality of memory groups 162, 164, 166, based on at least one first unit operation being performed in the plurality of memory groups 162, 164, 166 and at least one second unit operation assigned to the plurality of group queues 182, 184, 186, which is scheduled to be performed in the plurality of memory groups 162, 164, 166. Also, the resource management component 190 can determine second information (hereinafter, available resource information) that the controller 130 or the memory system 110 can allocate for performing the at least one first unit operation and the at least one second unit operation. Based on the first information regarding the operation status of the plurality of memory groups 162, 164, 166 and the second information regarding available resources for the plurality of memory groups 162, 164, 166, the resource management component 190 can control an assignment of an operation which is subject to a command output from the command queue 56 and assigned to the execution queue 180. For example, the resource management component 190 can determine which queue operations subject to commands queued in the command queue 56 are assigned to among the plurality of group queues 182, 184, 186 and the pending queue 188. In this procedure, the resource management component 190 can change or adjust an assignment sequence in which operations subject to plural input commands dequeued from the command queue 56 are assigned to the execution queue 180.

In addition, the resource management component 190 can transfer to the pending queue 188 information regarding an operation subject to an input command, which has not been transferred to the plurality of group queues 182, 184, 186. Based on the status information and the available resource information for the plurality of memory groups 162, 164, 166, the resource management component 190 can assign operations, which are included in, or have been assigned to, the pending queue 188, to the plurality of group queues 182, 184, 186.

The controller 130 can include a resource manager 190. According to an embodiment, the resource manager 190 may include a resource allocator 195 and a resource checker 192. For example, the resource checker 192 includes information regarding available resources in the memory system 110 and the controller 130. Further, the resource checker 192 can assign different weights to operations being performed, or scheduled to be performed, in the plurality of memory groups 162, 164, 166, according to a type of operations. The resource checker 192 can score operational burdens of the plurality of memory groups 162, 164, 166, based on the different weight, to determine the first information regarding the operation status of the plurality of memory groups 162,

164, 166. For example, a read operation has a weight of 2, a program operation has a weight of 10, and an erase operation has a weight of 20. When a first memory group 162 is performing a read operation and a first group queue 182 corresponding to the first memory group 162 includes another read operation and a program operation scheduled to be performed in the first memory group 162, first information regarding the operation status of the first memory group 162 can be quantified as 14 (=2×2+10×1). Further, as another example, an erase operation is being performed in the second memory group 164, and a read operation and a write operation are included in, or have been assigned to, the second group queue 184 corresponding to the second memory group 164. In this case, first information regarding the operating state of the second memory group 164 may be quantified as 32 (=20×1+2×1+10×1).

The weight given by the resource checker 192 can vary depending on the type of data input/output operations. According to an embodiment, the weight may be adjusted or changed according to a size or a quantity of resources spent on data input/output operations. For example, when an operation margin of a read operation set in the memory system 110 is a and an operation margin of a write operation is 3α, a weight given to the write operation can be three times greater than that given to the read operation.

The resource checker 192 may determine the second information regarding available resources that can be allocated for an operation by the memory system 110 or the controller 130. According to an embodiment, the resource checker 192 may determine not only the maximum number of resources that the memory system 110 or the controller 130 can utilize or allocate, but also a quantity of resources that the memory systems 110 or the controller 130 can allocate for a first unit operation being performed in the plurality of memory groups 162, 164, 166 and a second unit operation which is scheduled to be performed in the plurality of memory groups 162, 164, 166 and assigned to the plurality of group queues 182, 184, 186. For example, the number of resources may be the same as a quantity of metadata which is related to the data input/output operation and allocated in a flash translation layer (FTL) or a flash interface layer (FIL) in the controller 130. For example, when the maximum number of resources that the memory system 110 or the controller 130 can allocate is 20, a single resource can be allocated for a single data input/output operation. If one operation is being performed in the first memory group 162 and the first group queue 182 includes three operations scheduled to be performed in the first memory group 162, four resources are already allocated for the first memory group 162. Accordingly, when the maximum number of resources is 20 but 4 resources have been allocated, the second information regarding available resources can be 16. Also, if there are five operations being performed, or scheduled to be performed in the second memory group 164, the second information regarding available resources can be 11 (=16−5).

According to an embodiment, a quantity of resources can be equal to a quantity of threads that the controller 130 can control. In the memory system 110, a thread can be a component of a process or a procedure. Further, a thread of execution can be a sequence of programmed instructions that can be managed independently by the controller 130.

When the resource checker 192 determines the status information and available resource information for the plurality of memory groups 162, 164, 166, the resource allocator 194 determines which operation subject to a command in the command queue 56 is assigned to the execution queue 180. As an example, the maximum number of resources that the memory system 110 or the controller 130 can allocate is 20. Twenty resources can be allocated for first unit operations being performed in the plurality of memory groups 162, 164, 166 and second unit operations which are scheduled to be performed in the plurality of memory groups 162, 164, 166 and assigned to the plurality of group queues 182, 184, 186. When all twenty resources have been allocated for the first and second unit operations, the resource allocator 194 may transfer information regarding an operation subject to a command dequeued from the command queue 56 to the pending queue 188 in the execution queue 180. On the other hand, when 15 resources have been allocated for the first unit operations being performed in the plurality of memory groups 162, 164, 166 and the second unit operations which are scheduled to be performed in the plurality of memory groups 162, 164, 166 and have been assigned to the plurality of group queues 182, 184, 186, the resource allocator 194 can transmit information regarding five unit operations subject to at least one command stored in the command queue 56 (or the pending queue 188) into the plurality of group queues 182, 184, 186, based on the available resource information.

According to an embodiment, the resource allocator 194 can transfer information regarding operations subject to commands dequeued from the command queue 56 to the execution queue 180. The resource allocator 194 can change or adjust an assignment sequence of the unit operations to the execution queue 180. For example, there is at least one available resource and a unit operation, which corresponds to a command dequeued from the command queue 56 and is to be assigned to the execution queue 180, is a write operation. The resource allocator 194 can compare operation statuses of the plurality of memory groups 162, 164, 166 with each other, and assign the write operation to a memory group corresponding to the lowest scored value. For example, if the operation statuses of the first to third memory groups 162, 164, 166 are determined to be values of 10, 30, and 2, respectively, the write operation can be assigned to be performed in the third memory group 166.

As an example, an operation subject to a command, which is output from the command queue 56, includes plural read unit operations for reading data in all of the first to third memory groups 162, 164, 166. When the operation status of the first memory group 162 is excessively greater than those of the other memory groups 164, 166, the read unit operation to be performed in the first memory group 162 can be transferred into the pending queue 188. Further, even though the read unit operations can be quickly performed in the other memory groups 164, 166, the waiting time for the read operation can be long because the read operation is successfully completed when the read unit operation performed in the first memory group 162 is done. Accordingly, if another data input/output operation can be performed earlier than the read operation, data input/output performance of the system 110 can be improved. If another operation subject to another command output from the command queue 56 following the read operation is a write operation to be performed in the third memory group 166 only, the resource allocator 194 can assign the write operation to the third memory group earlier than the corresponding read operation to be performed in all of the first to third memory groups 162, 164, 166.

According to an embodiment, the resource allocator 194 can divide an operation subject to a command output from the command queue 56 into plural unit operations corresponding to the respective memory groups 162, 164, 166. As described above, the plurality of memory groups 162, 164, 166 can independently perform data input/output unit operations. The resource allocator 194 may determine whether an operation subject to a command input from the external device includes plural unit operations performed in some of the plurality of memory groups 162, 164, 166 or a unit operation performed in a specific memory group only among the plurality of memory groups 162, 164, 166. For example, when an operation subject to a command input from the external device should be performed in the plurality of memory groups 162, 164, 166, the resource allocator 194 can divide the operation into unit operations or tasks, which can be assigned to the memory groups 162, 164, 166, and transfer the unit operations into the group queues 182, 184, 186, each group queue corresponding to each of the plurality of memory groups 162, 164, 166.

As described above, the controller 130 may determine not only the first information regarding an operation status of the memory device 150 based on an operation being performed by the memory device 150 and an operation scheduled to be performed by the memory device 150, but also the second information regarding available resources allocated and controlled by the memory system 110 and the controller 130. The controller 130 can divide an operation or task corresponding to the command transmitted from an external device into unit operations corresponding to the plurality of memory groups 162, 164, 166 in the memory device 150, and assign the unit operations to the plurality of memory groups 162, 164, 166 based on the first and second information regarding the operation statuses and available resources. Through this, the controller 130 may improve data input/output performance of the memory system 110 and more clearly estimate or predict a completion time of the data input/output operation.

Hereinafter, descriptions will be made focusing on operations or components that can be technically distinguished between the controller 130 and the memory device 150 described in FIG. 1 and FIGS. 2 to 4. Specifically, a flash translation layer (FTL) 240 in the controller 130 will be described in more detail with reference to FIGS. 3 to 4. According to an embodiment, roles and functions of the flash translation layer (FTL) in the controller 130 may be varied.

Figure 2:
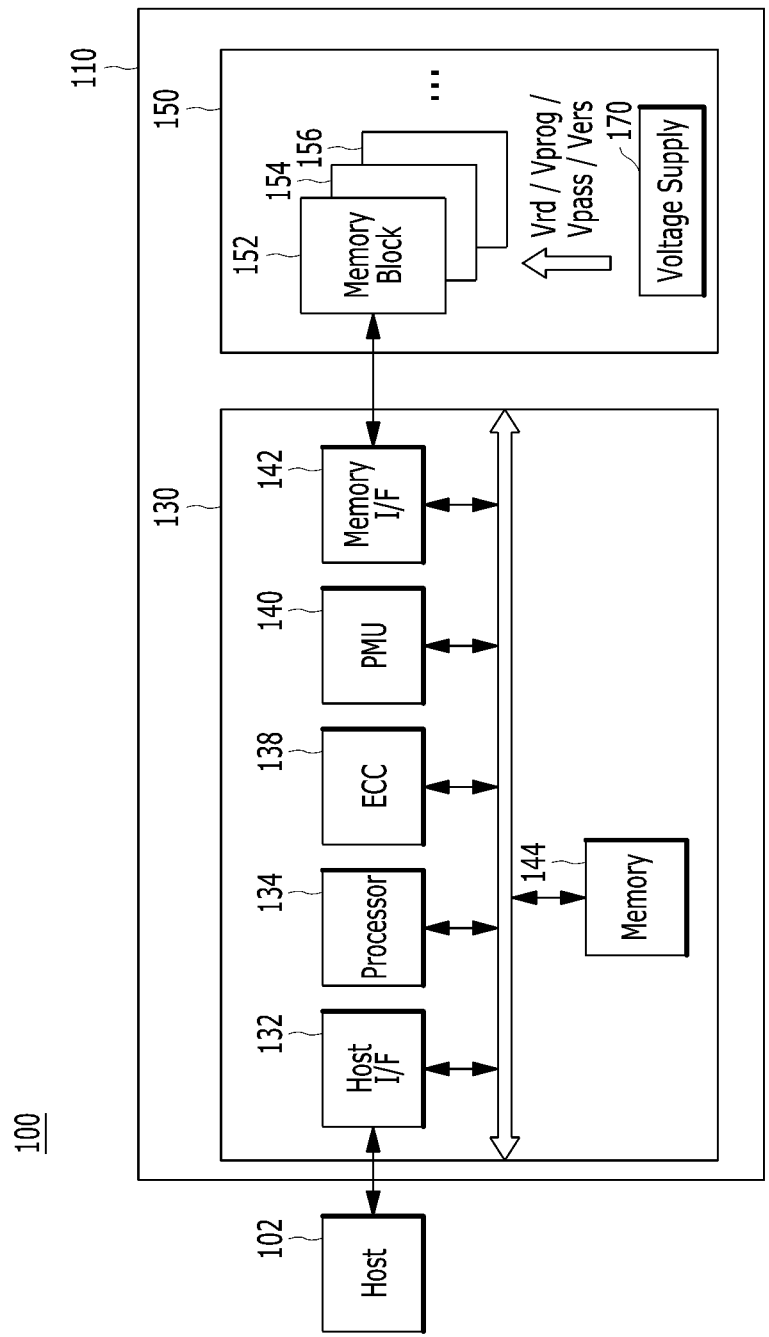
FIG. 2 illustrates a data processing system according to an embodiment of the present disclosure.
Figure 3:
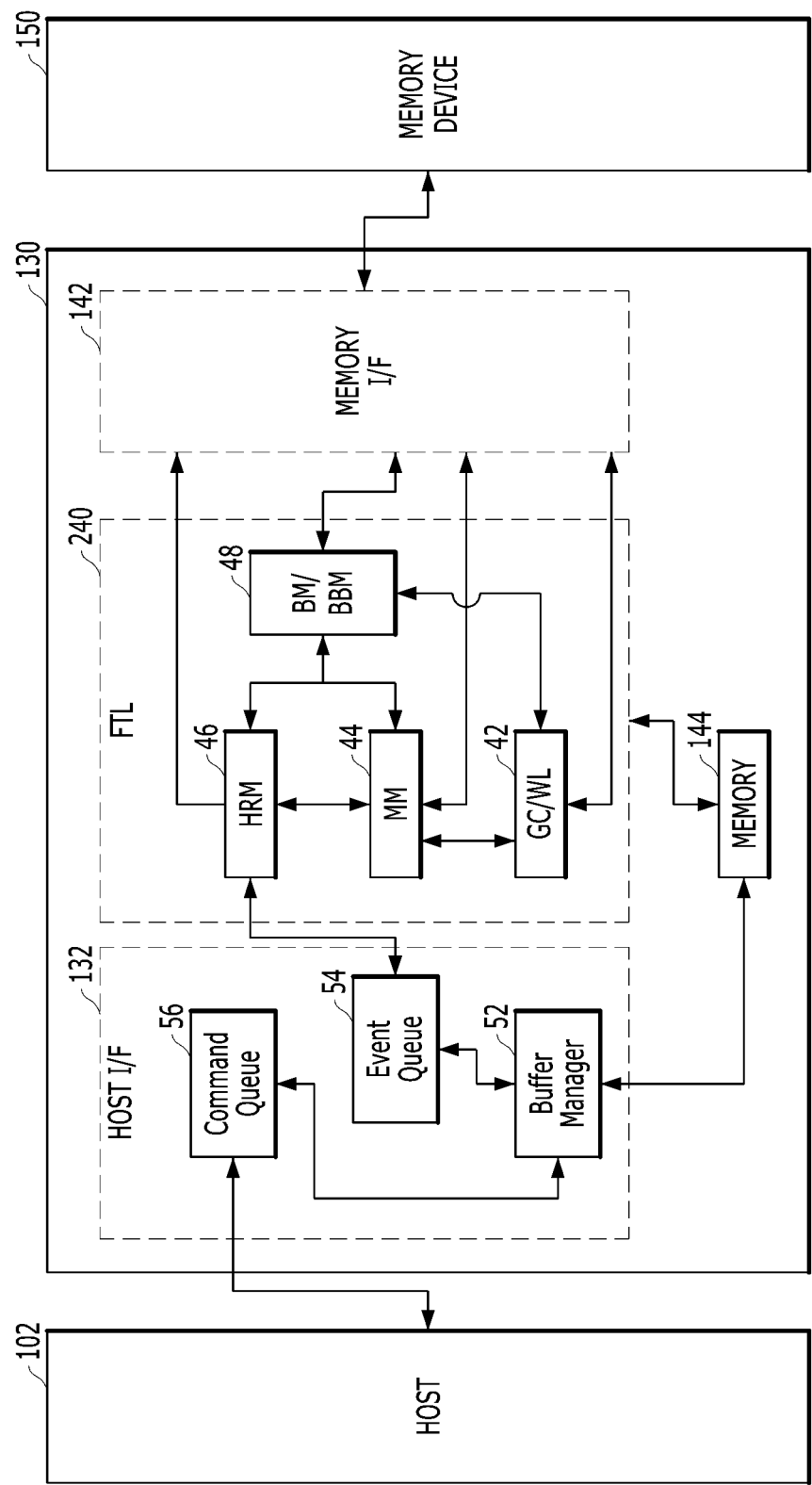
FIG. 3 illustrates a memory system according to another embodiment of the present disclosure.

FIGS. 2 and 3 illustrate some operations that may be performed by the memory system 110 according to one or more embodiments of the present disclosure.

Referring to FIG. 2, the data processing system 100 may include a host 102 engaged or coupled with a memory system, such as memory system 110. For example, the host 102 and the memory system 110 can be coupled to each other via a data bus, a host cable and the like to perform data communication.

The memory system 110 may include a memory device 150 and a controller 130. The memory device 150 and the controller 130 in the memory system 110 may be considered components or elements physically separated from each other. The memory device 150 and the controller 130 may be connected via at least one data path. For example, the data path may include a channel and/or a way.

According to an embodiment, the memory device 150 and the controller 130 may be components or elements functionally divided. Further, according to an embodiment, the memory device 150 and the controller 130 may be implemented with a single chip or a plurality of chips. The controller 130 may perform a data input/output operation in response to a request input from the external device. For example, when the controller 130 performs a read operation in response to a read request input from an external device, data stored in a plurality of non-volatile memory cells included in the memory device 150 is transferred to the controller 130.

As shown in FIG. 1, the memory device 150 may include a plurality of memory blocks 152, 154, 156. The memory block 152, 154, 156 may be understood as a group of non-volatile memory cells in which data is removed together by a single erase operation. Although not illustrated, the memory block 152, 154, 156 may include a page which is a group of non-volatile memory cells that store data together during a single program operation or output data together during a single read operation. For example, one memory block may include a plurality of pages.

For example, the memory device 150 may include a plurality of memory planes or a plurality of memory dies. According to an embodiment, the memory plane may be considered a logical or a physical partition including at least one memory block, a driving circuit capable of controlling an array including a plurality of non-volatile memory cells, and a buffer that can temporarily store data inputted to, or outputted from, non-volatile memory cells.

In addition, according to an embodiment, the memory die may include at least one memory plane. The memory die may be understood as a set of components implemented on a physically distinguishable substrate. Each memory die may be connected to the controller 130 through a data path. Each memory die may include an interface to exchange an item of data and a signal with the controller 130.

According to an embodiment, the memory device 150 may include at least one memory block 152, 154, 156, at least one memory plane, or at least one memory die. The internal configuration of the memory device 150 shown in FIG. 1 may be different according to performance of the memory system 110. An embodiment of the present disclosure is not limited to the internal configuration shown in FIG. 2.

Referring to FIG. 2, the memory device 150 may include a voltage supply circuit 170 capable of supplying at least some voltage into the memory block 152, 154, 156. The voltage supply circuit 170 may supply a read voltage Vrd, a program voltage Vprog, a pass voltage Vpass, or an erase voltage Vers into a non-volatile memory cell included in the memory block. For example, during a read operation for reading data stored in the non-volatile memory cell included in the memory block 152, 154, 156, the voltage supply circuit 170 may supply the read voltage Vrd into a selected non-volatile memory cell. During the program operation for storing data in the non-volatile memory cell included in the memory block 152, 154, 156, the voltage supply circuit 170 may supply the program voltage Vprog into a selected non-volatile memory cell. Also, during a read operation or a program operation performed on the selected nonvolatile memory cell, the voltage supply circuit 170 may supply a pass voltage Vpass into a non-selected nonvolatile memory cell. During the erasing operation for erasing data stored in the non-volatile memory cell included in the memory block 152, 154, 156, the voltage supply circuit 170 may supply the erase voltage Vers into the memory block.

The memory device 150 may store information regarding various voltages which are supplied to the memory block 152, 154, 156 based on which operation is performed. For example, when a non-volatile memory cell in the memory block 152, 154, 156 can store multi-bit data, plural levels of the read voltage Vrd for recognizing or reading the multi-bit data item may be required. The memory device 150 may include a table including information corresponding to plural levels of the read voltage Vrd, corresponding to the multi-bit data item. For example, the table can include bias values stored in a register, each bias value corresponding to a specific level of the read voltage Vrd. The number of bias values for the read voltage Vrd that is used for a read operation may be limited to a preset range. Also, the bias values can be quantized.

The host 102 may include a portable electronic device (e.g., a mobile phone, an MP3 player, a laptop computer, etc.) or a non-portable electronic device (e.g., a desktop computer, a game player, a television, a projector, etc.).

The host 102 may also include at least one operating system (OS), which can control functions and operations performed in the host 102. The OS can provide interoperability between the host 102 engaged operatively with the memory system 110 and a user who intends to store data in the memory system 110. The OS may support functions and operations corresponding to user's requests. By way of example but not limitation, the OS can be classified into a general operating system and a mobile operating system according to mobility of the host 102. The general operating system may be split into a personal operating system and an enterprise operating system according to system requirements or a user environment. As compared with the personal operating system, the enterprise operating systems can be specialized for securing and supporting high performance computing.

The mobile operating system may be subject to support services or functions for mobility (e.g., a power saving function). The host 102 may include a plurality of operating systems. The host 102 may execute multiple operating systems interlocked with the memory system 110, corresponding to a user's request. The host 102 may transmit a plurality of commands corresponding to the user's requests into the memory system 110, thereby performing operations corresponding to the plurality of commands within the memory system 110.

A controller 130 in the memory system 110 may control a memory device 150 in response to a request or a command input from the host 102. For example, the controller 130 may perform a read operation to provide data read from the memory device 150 to the host 102 and may perform a write operation (or a program operation) to store data input from the host 102 in the memory device 150. In order to perform data input/output (I/O) operations, the controller 130 may control and manage internal operations of reading data, programming data, erasing data, or the like.

According to an embodiment, the controller 130 may include a host interface 132, a processor 134, error correction circuitry (ECC) 138, a power management unit (PMU) 140, a memory interface 142, and a memory 144. Components included in the controller 130 as illustrated in FIG. 2 may vary according to structures, functions, operation performance, or the like, regarding the memory system 110.

For example, the memory system 110 may be implemented with any of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like. Components may be added to or omitted from the controller 130 according to implementation of the memory system 110.

The host 102 and the memory system 110 each may include a controller or an interface for transmitting and receiving signals, data, and the like, in accordance with one or more predetermined protocols. For example, the host interface 132 in the memory system 110 may include an apparatus capable of transmitting signals, data, and the like to the host 102 or receiving signals, data, and the like from the host 102.

The host interface 132 included in the controller 130 may receive signals, commands (or requests), and/or data input from the host 102. For example, the host 102 and the memory system 110 may use a predetermined set of rules or procedures for data communication or a preset interface to transmit and receive data therebetween. Examples of sets of rules or procedures for data communication or interfaces supported by the host 102 and the memory system 110 for sending and receiving data include Universal Serial Bus (USB), Multi-Media Card (MMC), Parallel Advanced Technology Attachment (PATA), Small Computer System Interface (SCSI), Enhanced Small Disk Interface (ESDI), Integrated Drive Electronics (IDE), Peripheral Component Interconnect Express (PCIe or PCI-e), Serial-attached SCSI (SAS), Serial Advanced Technology Attachment (SATA), Mobile Industry Processor Interface (MIPI), and the like. According to an embodiment, the host interface 132 is a type of layer for exchanging data with the host 102 and is implemented with, or driven by, firmware called a host interface layer (HIL). According to an embodiment, the host interface 132 can include the command queue 56 shown in FIG. 1.

The Integrated Drive Electronics (IDE) or Advanced Technology Attachment (ATA) may be used as one of the interfaces for transmitting and receiving data and, for example, may use a cable including 40 wires connected in parallel to support data transmission and data reception between the host 102 and the memory system 110. When a plurality of memory systems 110 are connected to a single host 102, the plurality of memory systems 110 may be divided into a master and a slave by using a position or a dip switch to which the plurality of memory systems 110 are connected. The memory system 110 set as the master may be used as a main memory device. The IDE (ATA) may include, for example, Fast-ATA, ATAPI, or Enhanced IDE (EIDE).

A Serial Advanced Technology Attachment (SATA) interface is a type of serial data communication interface that is compatible with various ATA standards of parallel data communication interfaces which are used by Integrated Drive Electronics (IDE) devices. The 40 wires in the IDE interface can be reduced to six wires in the SATA interface. For example, 40 parallel signals for the IDE can be converted into 6 serial signals for the SATA interface. The SATA interface has been widely used because of its faster data transmission and reception rate and its less resource consumption in the host 102 used for the data transmission and reception. The SATA interface may connect up to 30 external devices to a single transceiver included in the host 102. In addition, the SATA interface can support hot plugging that allows an external device to be attached to or detached from the host 102, even while data communication between the host 102 and another device is being executed. Thus, the memory system 110 can be connected or disconnected as an additional device, like a device supported by a universal serial bus (USB) even when the host 102 is powered on. For example, in the host 102 having an eSATA port, the memory system 110 may be freely attached to or detached from the host 102 like an external hard disk.

Small Computer System Interface (SCSI) is a type of serial data communication interface used for connecting a computer or a server with other peripheral devices. The SCSI can provide a high transmission speed, as compared with other interfaces such as IDE and SATA. In the SCSI, the host 102 and at least one peripheral device (e.g., memory system 110) are connected in series, but data transmission and reception between the host 102 and each peripheral device may be performed through a parallel data communication. In the SCSI, it is easy to connect or disconnect a device such as the memory system 110 to or from the host 102. The SCSI can support connections of 15 other devices to a single transceiver included in host 102.

Serial Attached SCSI (SAS) can be understood as a serial data communication version of the SCSI. In the SAS, the host 102 and a plurality of peripheral devices are connected in series, and data transmission and reception between the host 102 and each peripheral device may be performed in a serial data communication scheme. The SAS can support connection between the host 102 and the peripheral device through a serial cable instead of a parallel cable, to easily manage equipment using the SAS and enhance or improve operational reliability and communication performance. The SAS may support connections of eight external devices to a single transceiver included in the host 102.

The Non-volatile memory express (NVMe) is a kind of interface based at least on a Peripheral Component Interconnect Express (PCIe) designed to increase performance and design flexibility of the host 102, servers, computing devices, and the like equipped with the non-volatile memory system 110. The PCIe can use a slot or a specific cable for connecting a computing device (e.g., host 102) and a peripheral device (e.g., memory system 110). For example, the PCIe can use a plurality of pins (e.g., 18 pins, 32 pins, 49 pins, or 82 pins) and at least one wire (e.g., ×1, ×4, ×8, or ×16) to achieve high speed data communication over several hundred MB per second (e.g., 250 MB/s, 500 MB/s, 984.6250 MB/s, or 1969 MB/s). According to an embodiment, the PCIe scheme may achieve bandwidths of tens to hundreds of Giga bits per second. The NVMe can support an operation speed of the non-volatile memory system 110, such as an SSD, that is faster than a hard disk.

According to an embodiment, the host 102 and the memory system 110 may be connected through a universal serial bus (USB). The Universal Serial Bus (USB) is a type of scalable, hot-pluggable plug-and-play serial interface that can provide cost-effective standard connectivity between the host 102 and peripheral devices such as a keyboard, a mouse, a joystick, a printer, a scanner, a storage device, a modem, a video camera, and the like. A plurality of peripheral devices such as the memory system 110 may be coupled to a single transceiver included in the host 102.

Referring to FIG. 2, the error correction circuitry 138 can correct error bits of data read from the memory device 150, and may include an error correction code (ECC) encoder and an ECC decoder. The ECC encoder may perform error correction encoding of data to be programmed in the memory device 150 to generate encoded data into which a parity bit is added, and store the encoded data in the memory device 150. The ECC decoder can detect and correct error bits contained in the data read from the memory device 150 when the controller 130 reads the data stored in the memory device 150. For example, after performing error correction decoding on the data read from the memory device 150, the error correction circuitry 138 determines whether the error correction decoding has succeeded or not, and outputs an instruction signal (e.g., a correction success signal or a correction fail signal), based on a result of the error correction decoding. The error correction circuitry 138 may use a parity bit, which has been generated during the ECC encoding process for the data stored in the memory device 150, in order to correct the error bits of the read data. When the number of the error bits is greater than or equal to the number of correctable error bits, the error correction circuitry 138 may not correct the error bits and instead may output the correction fail signal indicating failure in correcting the error bits.

According to an embodiment, the error correction circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), or the like. The error correction circuitry 138 may include all circuits, modules, systems, and/or devices for performing the error correction operation based on at least one of the above described codes. The error correction circuitry 138 shown in FIG. 2 can include at least some of the components included in the controller 130 shown in FIG. 1.

For example, the ECC decoder may perform hard decision decoding or soft decision decoding on data transmitted from the memory device 150. The hard decision decoding can be understood as one of two methods broadly classified for error correction. The hard decision decoding may include an operation of correcting an error bit by reading digital data of '0' or '1' from a non-volatile memory cell in the memory device 150. Because the hard decision decoding handles a binary logic signal, the circuit/algorithm design or configuration may be simpler and a processing speed may be faster than the soft decision decoding.

The soft decision decoding may quantize a threshold voltage of a non-volatile memory cell in the memory device 150 by two or more quantized values (e.g., multiple bit data, approximate values, an analog value, and the like) in order to correct an error bit based on the two or more quantized values. The controller 130 can receive two or more alphabets or quantized values from a plurality of non-volatile memory cells in the memory device 150, and then perform a decoding based on information generated by characterizing the quantized values as a combination of information such as conditional probability or likelihood.

According to an embodiment, the ECC decoder may use a low-density parity-check and generator matrix (LDPC-GM) code among methods designed for the soft decision decoding. The low-density parity-check (LDPC) code uses an algorithm that can read values of data from the memory device 150 in several bits according to reliability, not simply data of 1 or 0 like the hard decision decoding, and iteratively repeats it through a message exchange in order to improve reliability of the values. Then, the values are finally determined as data of 1 or 0. For example, a decoding algorithm using LDPC codes can be understood as probabilistic decoding. The hard decision decoding in which a value output from a non-volatile memory cell is coded as 0 or 1. Compared to the hard decision decoding, the soft decision decoding can determine the value stored in the non-volatile memory cell based on the stochastic information. Regarding bit-flipping which may be considered an error that can occur in the memory device 150, the soft decision decoding may provide improved probability of correcting the error and recovering data, as well as providing reliability and stability of corrected data. The LDPC-GM code may have a scheme in which internal LDGM codes can be concatenated in series with high-speed LDPC codes.

According to an embodiment, the ECC decoder may use, for example, low-density parity-check convolutional codes (LDPC-CCs) for the soft decision decoding. The LDPC-CCs may have a scheme using a linear time encoding and a pipeline decoding based on a variable block length and a shift register.

According to an embodiment, the ECC decoder may use, for example, a Log Likelihood Ratio Turbo Code (LLR-TC) for the soft decision decoding. A Log Likelihood Ratio (LLR) may be calculated as a non-linear function for a distance between a sampled value and an ideal value. In addition, a Turbo Code (TC) may include a simple code (for example, a Hamming code) in two or three dimensions and repeat decoding in a row direction and a column direction to improve reliability of values.

The power management unit (PMU) 140 may control electrical power provided to the controller 130. The PMU 140 may monitor the electrical power supplied to the memory system 110 (e.g., a voltage supplied to the controller 130) and provide the electrical power to components included in the controller 130. The PMU 140 may not only detect power-on or power-off, but also generate a trigger signal to enable the memory system 110 to urgently back up a current state when the electrical power supplied to the memory system 110 is unstable. According to an embodiment, the PMU 140 may include a device or a component capable of accumulating electrical power that may be used in an emergency.

The memory interface 142 may serve as an interface for handling commands and data transferred between the controller 130 and the memory device 150, in order to allow the controller 130 to control the memory device 150 in response to a command or a request input from the host 102. The memory interface 142 may generate a control signal for the memory device 150 and may process data input to, or output from, the memory device 150 under the control of the processor 134 in a case when the memory device 150 is a flash memory.

For example, when the memory device 150 includes a NAND flash memory, the memory interface 142 includes a NAND flash controller (NFC). The memory interface 142 can provide an interface for handling commands and data between the controller 130 and the memory device 150. In accordance with an embodiment, the memory interface 142 can be implemented through, or driven by, firmware called a Flash Interface Layer (FIL) for exchanging data with the memory device 150. The memory interface 142 can include the execution queue 180 or the plurality of group queues 182, 184, 186 shown in FIG. 1.

According to an embodiment, the memory interface 142 may support an open NAND flash interface (ONFi), a toggle mode, or the like, for data input/output with the memory device 150. For example, the ONFi may use a data path (e.g., a channel, a way, etc.) that includes at least one signal line capable of supporting bi-directional transmission and reception in a unit of 8-bit or 16-bit data. Data communication between the controller 130 and the memory device 150 can be achieved through at least one interface regarding an asynchronous single data rate (SDR), a synchronous double data rate (DDR), a toggle double data rate (DDR), or the like.

The memory 144 may be used as a working memory of the memory system 110 or the controller 130, while temporarily storing transactional data of operations performed in the memory system 110 and the controller 130. For example, the memory 144 may temporarily store read data output from the memory device 150 in response to a read request from the host 102 before the read data is output to the host 102. In addition, the controller 130 may temporarily store write data input from the host 102 in the memory 144 before programming the write data in the memory device 150. When the controller 130 controls operations, such as a data read operation, a data write or program operation, a data erase operation, etc., of the memory device 150, data transmitted between the controller 130 and the memory device 150 of the memory system 110 may be temporarily stored in the memory 144.

In addition to the read data or write data, the memory 144 may store information (e.g., map data, read requests, program requests, etc.) used for inputting or outputting data between the host 102 and the memory device 150. According to an embodiment, the memory 144 may include one or more of a command queue, a program memory, a data memory, a write buffer/cache, a read buffer/cache, a data buffer/cache, a map buffer/cache, and so on. The controller 130 may allocate some storage space in the memory 144 for a component which is established to carry out a data input/output operation. For example, the write buffer established in the memory 144 may be used to temporarily store target data subject to a program operation.

In an embodiment, the memory 144 may be implemented with a volatile memory. For example, the memory 144 may be implemented with a static random access memory (SRAM), a dynamic random access memory (DRAM), or both. Although FIG. 2 illustrates, for example, the memory 144 disposed within the controller 130, embodiments are not limited thereto. The memory 144 may be located within or external to the controller 130. For instance, the memory 144 may be embodied by an external volatile memory having a memory interface transferring data and/or signals between the memory 144 and the controller 130.

The processor 134 may control the overall operations of the memory system 110. For example, the processor 134 can control a program operation or a read operation of the memory device 150 in response to a write request or a read request entered from the host 102. According to an embodiment, the processor 134 may execute firmware to control the program operation or the read operation in the memory system 110. Herein, the firmware may be referred to as a flash translation layer (FTL). An example of the FTL will be described in detail, referring to FIGS. 3 and 4. According to an embodiment, the processor 134 may be implemented with a microprocessor, a central processing unit (CPU), or the like.

According to an embodiment, the memory system 110 may be implemented with at least one multi-core processor. The multi-core processor is a type of circuit or chip in which two or more cores, which are considered distinct processing regions, are integrated. For example, when a plurality of cores in the multi-core processor drive or execute a plurality of flash translation layers (FTLs) independently, a data input/output speed (or performance) of the memory system 110 may be improved. According to an embodiment, the data input/output (I/O) operations in the memory system 110 may be independently performed through different cores in the multi-core processor.

The processor 134 in the controller 130 may perform an operation corresponding to a request or a command input from the host 102. Further, the memory system 110 may perform an operation independent from a command or a request input from the host 102. In one case, an operation performed by the controller 130 in response to the request or the command input from the host 102 may be considered a foreground operation, while an operation performed by the controller 130 independently from the request or the command input from the host 102 may be considered a background operation. The controller 130 can perform foreground or background operations for reading, writing, or erasing data in the memory device 150. In addition, a parameter set operation corresponding to a set parameter command or a set feature command as a set command transmitted from the host 102 may be considered a foreground operation. As a background operation that is performed without a command transmitted from the host 102, the controller 130 can perform garbage collection (GC), wear leveling (WL), bad block management for identifying and processing bad blocks, or the like.

According an embodiment, substantially similar operations may be performed as both the foreground operation and the background operation. For example, when the memory system 110 performs garbage collection in response to a request or a command input from the host 102 (e.g., Manual GC), the garbage collection can be considered a foreground operation. When the memory system 110 performs garbage collection independently of the host 102 (e.g., Auto GC), the garbage collection can be considered a background operation.

When the memory device 150 includes a plurality of dies (or a plurality of chips) each including a plurality of non-volatile memory cells, the controller 130 may perform parallel processing regarding plural requests or commands input from the host 102 in order to improve performance of the memory system 110. For example, the transmitted requests or commands may be divided into plural groups including at least some of a plurality of planes, a plurality of dies, or a plurality of chips included in the memory device 150, and the plural groups of requests or commands are processed individually or in parallel in each plane, each die or each chip.

The memory interface 142 in the controller 130 may be connected to the plurality of dies or chips in the memory device 150 through at least one channel and at least one way. When the controller 130 distributes and stores data in the plurality of dies through each channel or each way in response to requests or commands associated with a plurality of pages including non-volatile memory cells, a plurality of operations corresponding to the requests or the commands can be performed simultaneously or in parallel in the plurality of dies or planes. Such a processing method or scheme can be considered as an interleaving method. Because a data input/output speed of the memory system 110 increases by operating with the interleaving method, data I/O performance of the memory system 110 can be improved.

By way of example but not limitation, the controller 130 can recognize statuses of a plurality of channels (or ways) associated with the plurality of dies included in the memory device 150. The controller 130 may determine a status of each channel or each way as one of a busy status, a ready status, an active status, an idle status, a normal status, and an abnormal status. The determination of which channel or way an instruction (and/or a data) is delivered through by the controller can be associated with a physical block address. The controller 130 may refer to descriptors delivered from the memory device 150. The descriptors may include a block or page of parameters describing something about the memory device 150. The descriptors can have a predetermined format or structure. For instance, the descriptors may include device descriptors, configuration descriptors, unit descriptors, and the like. The controller 130 may refer to, or use, the descriptors to determine which channel(s) or way(s) is used to exchange an instruction or data.

Referring to FIG. 2, the memory device 150 in the memory system 110 may include a plurality of memory blocks 152, 154, 156. Each of the plurality of memory blocks 152, 154, 156 includes a plurality of non-volatile memory cells. According to an embodiment, the memory block 152, 154, 156 can be a group of non-volatile memory cells erased together. The memory block 152, 154, 156 may include a plurality of pages which is a group of non-volatile memory cells read or programmed together.

In one embodiment, each memory block 152, 154, or 156 may have a three-dimensional stack structure for a high integration. Further, the memory device 150 may include a plurality of dies, each die including a plurality of planes, each plane including the plurality of memory blocks 152, 154, 156. A configuration of the memory device 150 may be changed depending on performance of the memory system 110.

FIG. 2 illustrates the memory device 150 that includes the plurality of memory blocks 152, 154, and 156. The plurality of memory blocks 152, 154, and 156 may be any of single-level cell (SLC) memory blocks, multi-level cell (MLC) memory blocks, or the like, according to the number of bits that can be stored in one memory cell. An SLC memory block includes a plurality of pages implemented by memory cells, each memory cell storing one bit of data. An SLC memory block may have higher data I/O operation performance and higher durability than the MLC memory block. The MLC memory block includes a plurality of pages implemented by memory cells, each memory cell storing multi-bit data (e.g., two or more bits of data). The MLC memory block may have larger storage capacity for the same space compared to the SLC memory block. The MLC memory block can be highly integrated in a view of storage capacity.

In an embodiment, the memory device 150 may be implemented with MLC memory blocks such as a double level cell (DLC) memory block, a triple-level cell (TLC) memory block, a quadruple-level cell (QLC) memory block, and a combination thereof. The DLC memory block may include a plurality of pages implemented by memory cells, each memory cell capable of storing 2-bit data. The TLC memory block can include a plurality of pages implemented by memory cells, each memory cell capable of storing 3-bit data. The QLC memory block can include a plurality of pages implemented by memory cells, each memory cell capable of storing 4-bit data. In another embodiment, the memory device 150 can be implemented with a block including a plurality of pages implemented by memory cells, each memory cell capable of storing five or more bits of data.

According to an embodiment, the controller 130 may use a MLC memory block included in the memory device 150 as an SLC memory block that stores one-bit data in one memory cell. A data input/output speed of the multi-level cell (MLC) memory block can be slower than that of the SLC memory block. That is, when the MLC memory block is used as the SLC memory block, a margin for a read or program operation can be reduced. For example, the controller 130 may perform a data input/output operation with a higher speed when the MLC memory block is used as the SLC memory block. Thus, the controller 130 may use the MLC memory block as a SLC buffer to temporarily store data because the buffer may require a high data input/output speed for improving performance of the memory system 110.

Further, according to an embodiment, the controller 130 can program data in a MLC a plurality of times without performing an erase operation on a specific MLC memory block included in the memory device 150. In general, non-volatile memory cells do not support data overwrite. However, the controller 130 may program 1-bit data in the MLC a plurality of times using a feature in which the MLC is capable of storing multi-bit data. For a MLC overwrite operation, the controller 130 may store the number of program times as separate operation information when 1-bit data is programmed in a MLC. According to an embodiment, an operation for uniformly levelling threshold voltages of the MLCs may be carried out before another 1-bit data is programmed in the same MLCs, each having stored another-bit data.

In an embodiment, the memory device 150 is embodied as a non-volatile memory such as a flash memory, for example, as a NAND flash memory, a NOR flash memory, or the like. In another embodiment, the memory device 150 may be implemented by at least one of a phase change random access memory (PCRAM), a ferroelectrics random access memory (FRAM), a spin transfer torque random access memory (STT-RAM), and a spin transfer torque magnetic random access memory (STT-MRAM), or the like.

Referring to FIG. 3, the controller 130 in a memory system operates along with the host 102 and the memory device 150. As illustrated, the controller 130 includes the host interface 132, a flash translation layer (FTL) 240, the memory interface 142, and the memory 144 previously identified with reference to FIG. 2.

According to an embodiment, the error correction circuitry 138 illustrated in FIG. 2 may be included in the flash translation layer (FTL) 240. In another embodiment, the error correction circuitry 138 may be implemented as a separate module, a circuit, firmware, or the like, which is included in or associated with the controller 130.

The host interface 132 may handle commands, data, and the like transmitted from the host 102. By way of example but not limitation, the host interface 132 may include a command queue 56, a buffer manager 52, and an event queue 54. The command queue 56 may sequentially store the commands, the data, and the like received from the host 102, and output them to the buffer manager 52, for example, in an order in which they are stored in the command queue 56. The buffer manager 52 may classify, manage, or adjust the commands, the data, and the like received from the command queue 56. The event queue 54 may sequentially transmit events for processing the commands, the data, and the like received from the buffer manager 52.

A plurality of commands or data of the same characteristic may be transmitted from the host 102, or a plurality of commands and data of different characteristics may be transmitted to the memory system 110 after being mixed or jumbled by the host 102. For example, a plurality of commands for reading data, i.e., read commands, may be delivered, or a command for reading data, i.e., a read command, and a command for programming/writing data, i.e., a write command, may be alternately transmitted to the memory system 110. The host interface 132 may sequentially store commands, data, and the like, which are transmitted from the host 102, in the command queue 56. Thereafter, the host interface 132 may estimate or predict what type of internal operations the controller 130 will perform according to the characteristics of the commands, the data, and the like, which have been transmitted from the host 102. The host interface 132 may determine a processing order and a priority of commands, data and the like based on their characteristics.

According to the characteristics of the commands, the data, and the like transmitted from the host 102, the buffer manager 52 in the host interface 132 is configured to determine whether the buffer manager 52 should store the commands, the data, and the like in the memory 144, or whether the buffer manager 52 should deliver the commands, the data, and the like to the flash translation layer (FTL) 240. The event queue 54 receives events, transmitted from the buffer manager 52, which are to be internally executed and processed by the memory system 110 or the controller 130 in response to the commands, the data, and the like, and delivers the events to the flash translation layer (FTL) 240 in the order of the events input to the event queue 54.

In accordance with an embodiment, the flash translation layer (FTL) 240 illustrated in FIG. 3 may implement a multi-thread scheme to perform data input/output (I/O) operations. A multi-thread FTL may be implemented through a multi-core processor using multi-thread included in the controller 130.

In accordance with an embodiment, the flash translation layer (FTL) 240 may include a host request manager (HRM) 46, a map manager (MM) 44, a state manager 42, and a block manager 48. The host request manager (HRM) 46 may manage the events transmitted from the event queue 54. The map manager (MM) 44 may handle or control map data. The state manager 42 may perform garbage collection (GC) or wear leveling (WL). The block manager 48 may execute commands or instructions onto a block in the memory device 150.

By way of example but not limitation, the host request manager (HRM) 46 may use the map manager (MM) 44 and the block manager 48 to handle or process requests according to read and program commands and events which are delivered from the host interface 132. The host request manager (HRM) 46 may send an inquiry request to the map manager (MM) 44 to determine a physical address corresponding to a logical address which is entered with the events. The host request manager (HRM) 46 may send a read request with the physical address to the memory interface 142 to process the read request, i.e., handle the events. In one embodiment, the host request manager (HRM) 46 may send a program request (or a write request) to the block manager 48 to program data to a specific empty page storing no data in the memory device 150, and then may transmit a map update request corresponding to the program request to the map manager (MM) 44 in order to update an item relevant to the programmed data in information of mapping the logical and physical addresses to each other.

The block manager 48 may convert a program request delivered from the host request manager (HRM) 46, the map manager (MM) 44, and/or the state manager 42 into a flash program request used for the memory device 150, in order to manage flash blocks in the memory device 150. In order to maximize or enhance program or write performance of the memory system 110, the block manager 48 may collect program requests and send flash program requests for multiple-plane and one-shot program operations to the memory interface 142. In an embodiment, the block manager 48 sends several flash program requests to the memory interface 142 to enhance or maximize parallel processing of a multi-channel and multi-directional flash controller.

In one embodiment, the block manager 48 may manage blocks in the memory device 150 according to the number of valid pages, select and erase blocks having no valid pages when a free block is needed, and select a block including the least number of valid pages when it is determined that garbage collection is to be performed. The state manager 42 may perform garbage collection to move valid data stored in the selected block to an empty block and erase data stored in the selected block so that the memory device 150 may have enough free blocks (i.e., empty blocks with no data). When the block manager 48 provides information regarding a block to be erased to the state manager 42, the state manager 42 may check all flash pages of the block to be erased to determine whether each page of the block is valid.

For example, to determine validity of each page, the state manager 42 may identify a logical address recorded in an out-of-band (OOB) area of each page. To determine whether each page is valid, the state manager 42 may compare a physical address of the page with a physical address mapped to a logical address obtained from an inquiry request. The state manager 42 sends a program request to the block manager 48 for each valid page. A map table may be updated by the map manager 44 when a program operation is complete.

The map manager 44 may manage map data, e.g., a logical-physical map table. The map manager 44 may process various requests, for example, queries, updates, and the like, which are generated by the host request manager (HRM) 46 or the state manager 42. The map manager 44 may store the entire map table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant map table stored in the memory device 150. When the number of dirty cache blocks in the map manager 44 exceeds a certain threshold value, a program request may be sent to the block manager 48, so that a clean cache block is made and a dirty map table may be stored in the memory device 150.

When garbage collection is performed, the state manager 42 copies valid page(s) into a free block, and the host request manager (HRM) 46 may program the latest version of the data for the same logical address of the page and currently issue an update request. When the state manager 42 requests the map update in a state in which the copying of the valid page(s) is not completed normally, the map manager 44 might not perform the map table update. This is because the map request is issued with old physical information when the state manger 42 requests a map update and a valid page copy is completed later. The map manager 44 may perform a map update operation to ensure accuracy when, or only if, the latest map table still points to the old physical address.

Figure 4:
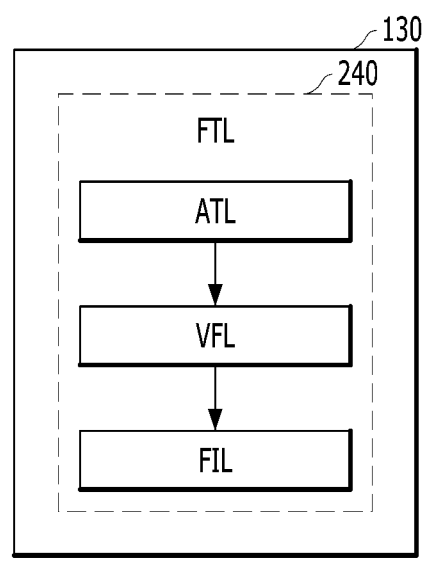
FIG. 4 illustrates internal configuration included in a controller shown in FIGS. 1 to 3 according to embodiments of the present disclosure.

FIG. 4 illustrates internal configuration of the controller shown in FIGS. 1 to 3 according to an embodiment of the present disclosure.

Referring to FIG. 4, the flash translation layer (FTL) 240 in the controller 130 can be divided into three layers: an address translation layer ATL; a virtual flash layer VFL; and a flash Interface Layer FIL.

For example, the address translation layer ATL may convert a logical address LA transmitted from a file system into a logical page address. The address translation layer ATL can perform an address translation process regarding a logical address space. That is, the address translation layer ATL can perform an address translation process based on mapping information to which the logical page address LPA of the flash memory 140 is mapped to the logical address LA transmitted from the host. Such logical-to-logical address mapping information (hereinafter referred to as L2L mapping) may be stored in an area in which metadata is stored in the memory device 150.

The virtual flash layer VFL may convert the logical page address LPA, which is mapped by the address translation layer ATL, into a virtual page address VPA. Here, the virtual page address VPA may correspond to a physical address of a virtual memory device. That is, the virtual page address VPA may correspond to the memory block 60 in the memory device 150. If there is a bad block among the memory blocks 60 in the memory device 150, the bad block may be excluded by the virtual flash layer VFL. In addition, the virtual flash layer VFL can include a recovery algorithm for scanning a scan area to restore the logical-to-virtual address mapping information (L2V mapping) stored in the memory device 150 and mapping information in the data region for storing user data. The recovery algorithm can be capable of recovering the logical-to-virtual address mapping information (L2V mapping). The virtual flash layer VFL may perform an address conversion process regarding the virtual address space, based on the logical-to-virtual address mapping information (L2V mapping) restored through the recovery algorithm.

The flash interface layer FIL can convert a virtual page address of the virtual flash layer VFL into a physical page address of the memory device 150. The flash interface layer FIL performs a low-level operation for interfacing with the memory device 150. For example, the flash interface layer FIL can include a low-level driver for controlling hardware of the memory device 150, an error correction code (ECC) for checking and correcting an error in data transmitted from the memory device 150, and a module for performing operations such as Bad Block Management (BBM).

Figure 5:
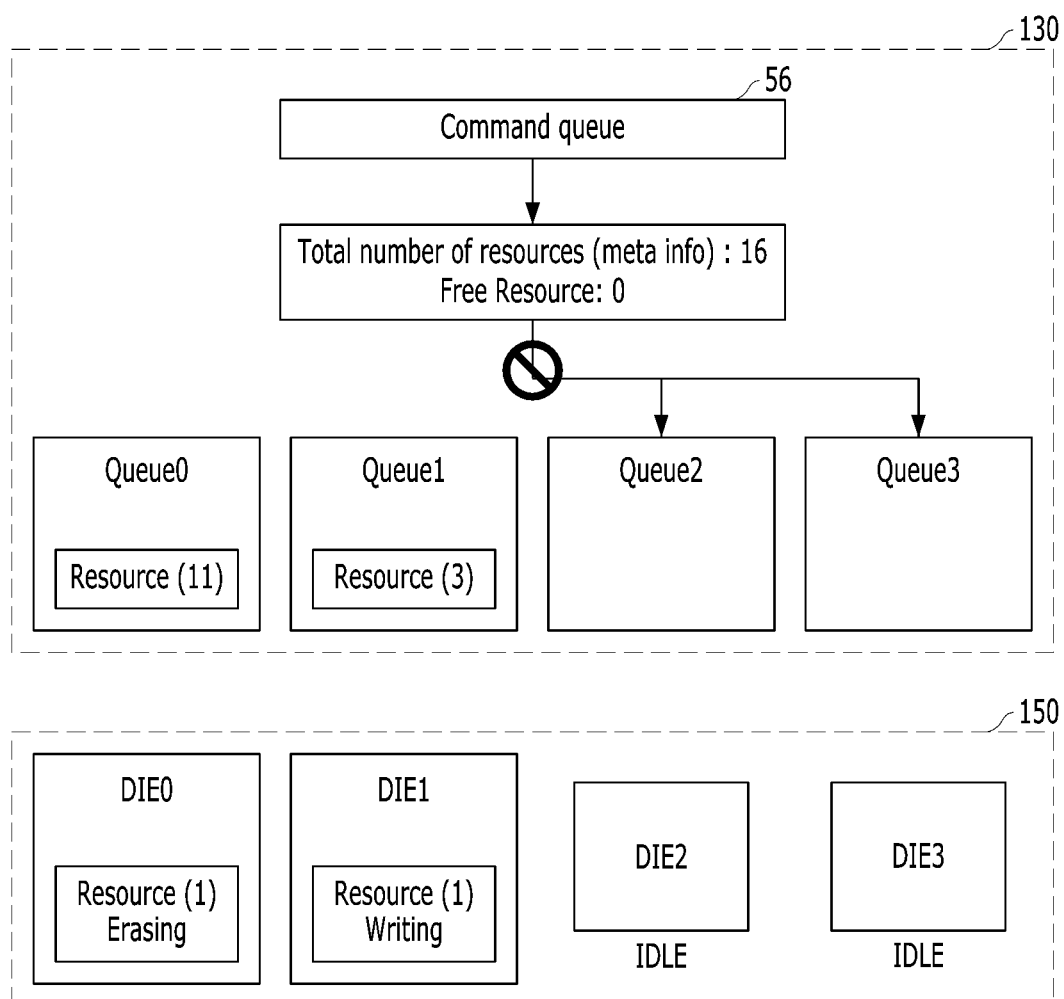
FIG. 5 illustrates an inefficient management of data input/output operations performed in a memory system.

FIG. 5 illustrates an inefficient management of data input/output operations performed in a memory system.

Referring to FIG. 5, a plurality of dies DIE0 to DIE3 in the memory device 150 may correspond to a plurality of memory groups 162, 164, 166 shown in FIG. 1. The plurality of dies DIE0 to DIE3 is capable of independently performing data input/output operations. A plurality of queues Queue0 to Queue3 in the controller 130 and the plurality of dies DIE0 to DIE3 in the memory device 150 can correspond one-to-one.

A first erase operation is performed in a first die DIE0 and one resource is allocated for the first erase operation. A first program (write) operation is performed on a second die DIE1 and one resource is allocated for the first program operation. On the other hand, there is no operation being performed in the third and fourth dies DIE2, DIE3, and the third and fourth dies DIE2, DIE3 are currently in an idle state. Also, referring to the plurality of queues Queue0 to Queue3 including unit operations scheduled to be performed in the plurality of dies DIE0 to DIE3, 11 unit operations are assigned to the first queue Queue0 and 11 resources are allocated for the 11 unit operations. 3 unit operations are assigned to the second queue Queue1 and three resources are allocated for the 3 unit operations. On the other hand, no unit operation may be included in the third and fourth queues Queue2, Queue3 and no resources may be allocated for the third and fourth dies DIE2, DIE3.

If the total number of resources that the controller 130 can allocate is 16, the number of available resources (Free Resource) becomes 0. That is, all 16 resources have been allocated for at least one first unit operation performed in the first and second dies DIE0 and DIE1 and at least one second unit operation which is assigned to the first and second queues Queue0, Queue1 and is scheduled to be performed in the first and second dies DIE0, DIE1.

Because there is no available resource, other unit operations corresponding to the command dequeued from the command queue 56 could not be assigned to the third and fourth queues Queue2, Queue3 corresponding to the third and fourth dies DIE2, DIE3, even if the other unit operations could be performed in the third and fourth dies DIE2, DIE3 only. When the controller 130 sequentially assigns unit operations and tasks corresponding to the command dequeued from the command queue 56 to the plurality of queues Queue0 to Queue3 based on available resource information, some of the plurality of dies DIE0 to DIE3 may be placed in a busy state, and others may be placed in an idle state. Even if the plurality of dies DIE0 to DIE3 can independently perform data input/output operations, the case described in FIG. 5 may occur when the controller 130 does not effectively assign the plurality of unit operations to the plurality of dies DIE0 to DIE3. In this case, data input/output performance of the memory system can be deteriorated.

Figure 6:
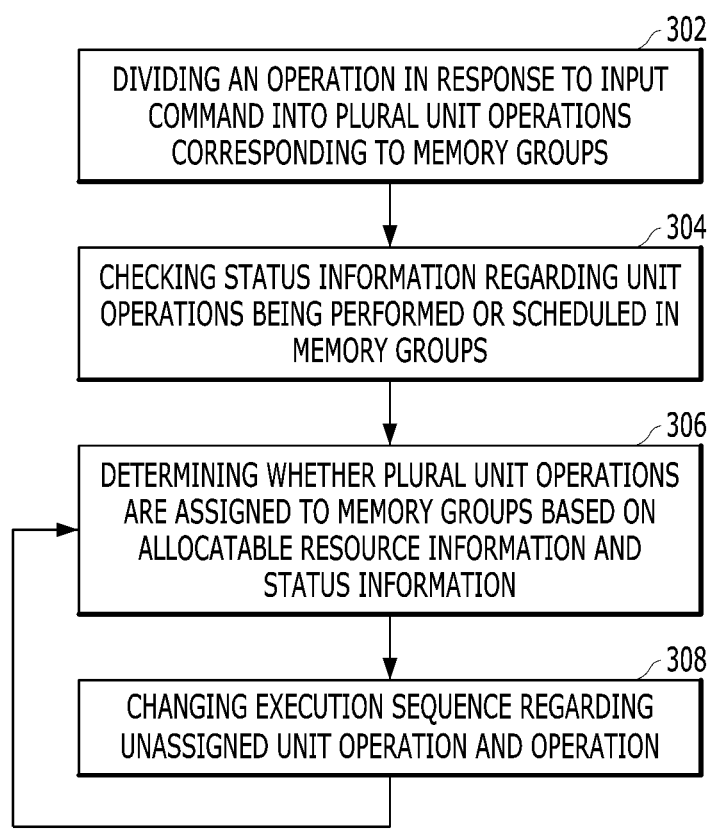
FIG. 6 illustrates a method for operating a memory system according to an embodiment of the present disclosure.

FIG. 6 illustrates a method for operating a memory system according to an embodiment of the present disclosure.

Referring to FIG. 6, the method for operating the memory system can include dividing an operation in response to an input command into plural unit operations corresponding to memory groups (302), checking status information regarding unit operations being performed, or scheduled to be performed, in the memory groups (304), and determining whether plural unit operations are assigned to memory groups based on available resource information and the status information of the memory groups (306). Herein, the memory groups can be individually configured to perform data input/output (I/O) operations in an interleaved mode. For example, the respective memory group includes a memory die or a memory plane.

After receiving a command input from an external device, the memory system 110 can recognize a type of the command and which memory group an operation subject to the command would be performed in. For example, the input command can be classified into a read command, a program command, and an erase command. An external device (e.g., the host 102 shown in FIGS. 2 to 3) in communication with the memory system 110 may transmit a command having a format corresponding to a preset protocol. Also, when a command input from the external device is related to a data input/output operation, the corresponding command may be input along with an address. Typically, the external device can transmit an address corresponding to an address scheme used by the external device to the memory system. An example of the address is a logical address. The memory system can perform address translation on the logical address to obtain a physical address. Herein, the physical address may be an address system used inside the memory system. According to an embodiment, the external device can transmit both a logical address and a physical address to the memory system. The memory system can recognize what type of operation is performed inside the memory system and where the operation should be performed based on the command and the address input from the external device. Based on this information, the memory system 110 can divide an operation or task corresponding to a command input from the external device into at least one unit operation corresponding to at least one memory group (302). Herein, the memory group may be understood as a component capable of independently performing a data input/output operation within the memory device 150.

The memory system 110 can collect information regarding at least one first unit operation being performed in the memory group and at least one second unit operation scheduled to be performed in the memory group (304). For example, the first unit operation being performed in the memory group may be recognized based on a command transmitted from the controller 130 to the memory group or a command waiting to receive a response from the memory group. Also, the second unit operation scheduled to be performed in the memory group may be recognized based on information included in a queue corresponding to each memory group.

According to an embodiment, the memory system 110 can assign a different weight to the at least one first unit operation and the at least one second unit operation, according to a type of unit operation, and quantify status information of each memory group. Herein, the weight given according to the type of the unit operation can vary according to resources spent on the unit operation. For example, operation margins (e.g., a time range in which an operation is normally performed) of three data input/output operations of a read operation, a program operation, and an erase operation are 1 second, 5 seconds, and 10 seconds, individually. In this case, the weight may be determined as 1 for each read operation, 5 for each program operation, and 10 for each erase operation. An operation time, power consumption, etc. may be utilized as a source or a reference used to determine a weight given to a unit operation. For example, two read operations are being performed, or scheduled to be performed, in the first memory group and three write operations are being performed, or scheduled to be performed, in the second memory group. Information regarding an operation status of the first memory group can be 2 (=1×2), and information regarding an operation status of the second memory group can be quantified as 15 (=5×3).

After determining available resource information and status information of the memory groups, the memory system 110 can determine whether to assign a unit operation based on the available resource information and the status information (306). The available resource information may be determined by subtracting the number of resources which have been allocated for a unit operation being performed, or scheduled to be performed, in the memory groups from the maximum number of resources controlled by the memory system 110. For example, when the maximum number of resources in the memory system 110 is 20 and the number of allocated resources is 12, the available resource information become 8 (=20−12).

The maximum number of resources in the memory system 110 or the controller 130 can vary depending on performance and design of the memory system 110. According to an embodiment, the maximum number of resources can be the same as the number of data input/output related meta information allocated by a flash translation layer (FTL) or a flash interface layer (FIL) in the controller 130. In another embodiment, the maximum number of resources may be the same as the number of threads that the controller 130 can control.

According to an embodiment, the memory system 110 can determine how many more unit operations can be assigned based on the available resource information. For example, if the available resource information is 5, the controller 130 can assign five unit operations to a plurality of queues corresponding to a plurality of memory groups. The memory system 110 can determine which queue(s) the unit operations is assigned to among a plurality of queues corresponding to the plurality of memory groups, in response to the status information regarding the memory groups. For example, status information regarding a first memory group can be determined based on a first unit operation being performed in the first memory group and a second unit operation scheduled to be performed in the first memory group. Then, the status information regarding the first memory group can be compared with a reference. When the status information is equal to or greater than the reference, the memory system 110 can assign at least one other unit operation scheduled to be performed in other memory groups, not the unit operation scheduled to be performed in the first memory group, to a queue corresponding to the other memory groups. The unit operation scheduled to be performed in the first memory group may be assigned to the pending queue 188. Through these processes, the memory system 110 can avoid the situation, shown in FIG. 5, in which all resources are allocated for operations to be performed in a specific memory group and other memory groups are in an idle state. Accordingly, data I/O performance of the memory system 110 can be improved.

Also, the method for operating the memory system can further include changing an execution order of unassigned operations and unassigned unit operations (308). The memory system 110 can assign a unit operation to be performed in the corresponding memory group according to the status information of each memory group. However, depending on a type of the data input/output operation or an execution range of the data input/output operation, a specific unit operation could not be assigned but another unit operation can be assigned to improve the data I/O performance of the memory system 110. Based on the status information of each memory group and information regarding a to-be-assigned unit operation with a weight, the memory system 110 can determine which unit operation can be assigned first among unassigned unit operations. Thus, the memory system 110 can change or adjust the execution order (or assignment sequence) of the unassigned operations or the unassigned unit operations to improve data input/output performance.

Figure 7:
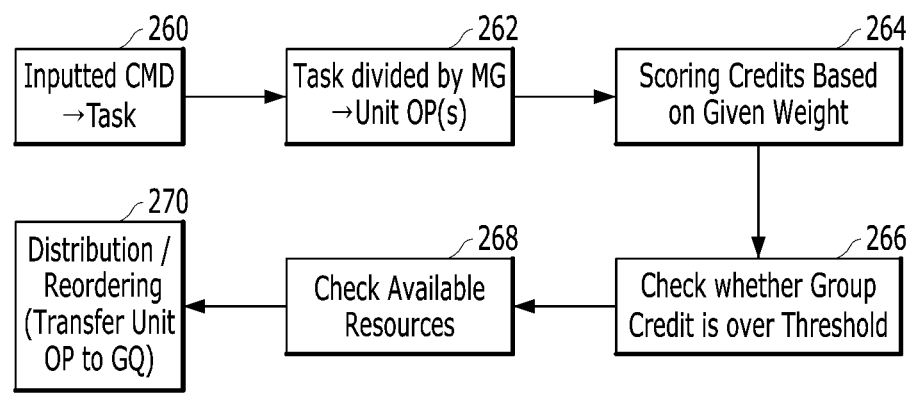
FIG. 7 illustrates a first example of a controller configured to control a data input/output operation, according to an embodiment of the present disclosure.

FIG. 7 illustrates a first example of a controller configured to control a data input/output operation, according to an embodiment of the present disclosure.

Referring to FIG. 7, the controller 130 may recognize an input command CMD and generate a task (operation 260). The controller 130 may divide the task into at least one unit operation (Unit OP(s)) corresponding to each of a plurality of memory groups MG (operation 262).

The controller 130 may calculate credits which are used for determining status information for the plurality of memory groups (operation 264). Here, the credits may be determined based on preset weights. The weights can be a numeral value set according to a type of unit operation. According to an embodiment, the weight may be determined according to resources consumed for a unit operation by each memory group. For example, consumed resources can include power, time, and the like. The controller 130 can determine a credit in response to a type and a quantity of unit operations being performed, or scheduled to be performed, in each memory group.

The controller 130 may compare credits determined as status information for the plurality of memory groups with a reference or a threshold (operation 266). If the credit of a specific memory group is equal to or greater than the reference or the threshold, the controller 130 may block additional assignment of a unit operation to the corresponding memory group. According to an embodiment, the controller 130 can transmit an unassigned unit operation to the pending queue 188 shown in FIG. 1. When the credits, which are status information for the plurality of memory groups, are compared with a reference, the controller 130 may determine which memory group a new unit operation can be assigned to.

The controller 130 may check whether there are available resources (operation 268). Whenever a unit operation is assigned to group queues (GQ) 182, 184, 186 (see FIG. 1) corresponding to a plurality of memory groups, the controller 130 can decrease the number of available resources. In addition, when a result or response of the unit operation being performed from the plurality of memory groups 162, 164, 166 in the memory device 150 is transmitted to the controller 130, the controller 130 can increase the number of available resources.

When there is an available resource, the controller 130 can transmit a unit operation (Unit OP) to at least one of the group queues 182, 184, 186 corresponding to the plurality of memory groups (operation 270). On the other hand, when there is no available resource, the controller 130 can transmit the corresponding unit operation (Unit OP) to the pending queue 188.

According to an embodiment, the controller 130 may assign a unit operation in an order of a memory group having a low credit to a memory group having a high credit. Further, the controller 130 may reorder or change an assignment order of the unit operations to be performed in the memory group and to be assigned to the group queue (operation 270).

Also, according to an embodiment, the controller 130 can change or reorder the order of the unit operations to be executed, to reduce a deviation between the status information of the memory groups. If the deviation of the status information of the memory groups could be reduced, an operation period (e.g., a parallel processing period) in which the data input/output operations are performed in parallel in plural memory groups can be increased, so that performance regarding the data input/output operation of the memory system could be improved.

Figure 8:
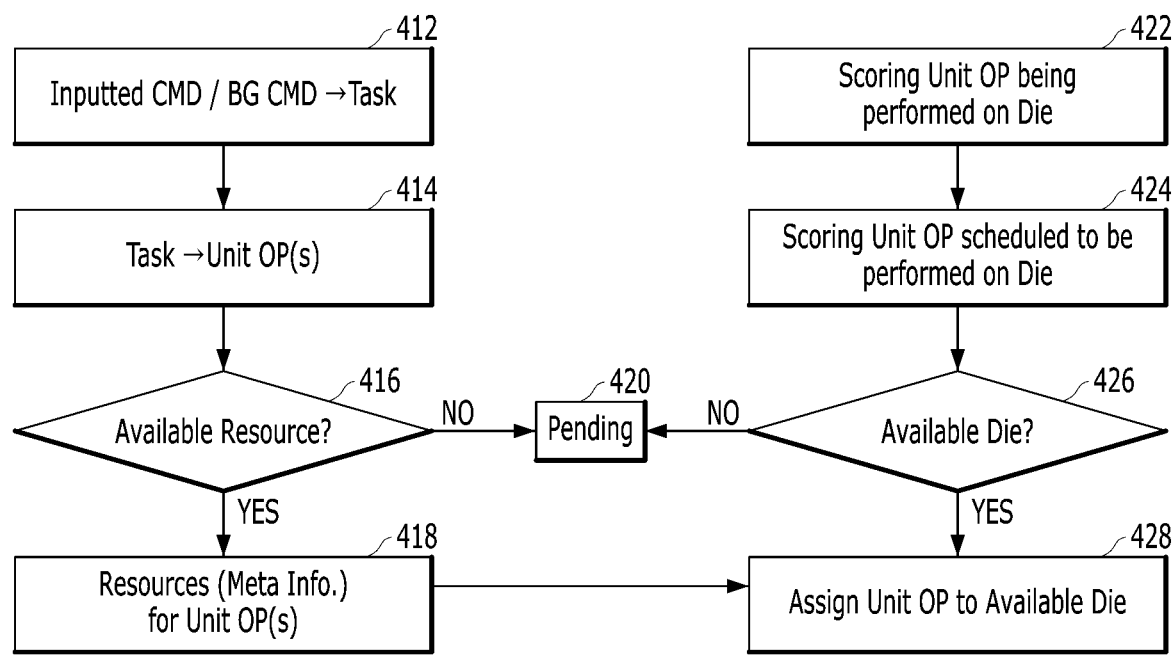
FIG. 8 illustrates a second example of the controller configured to control a data input/output operation, according to another embodiment of the present disclosure.

FIG. 8 illustrates a second example of the controller configured to control a data input/output operation, according to another embodiment of the present disclosure.

Referring to FIG. 8, the controller 130 can perform both an operation for allocating available resources of the memory system to a unit operation and another operation for determining which die a unit operation is assigned based on status information of dies in parallel, in order to increase efficiency in performing data input/output operations in the memory system.

The controller 130 may generate a task corresponding to an input command (Inputted CMD) or a command (BG CMD) generated as a background operation (operation 412). Here, the command generated as the background operation may include a read, program, or erase command generated for garbage collection, wear leveling, or the like.

The controller 130 can divide the generated task into unit operations (Unit OP(s)) (operation 414). Herein, the unit operation (Unit OP(s)) may be separated based on a die. For example, when a read task is performed on two dies, the read task may be divided into two read unit operations. Here, the die is presented as an example corresponding to a region within the memory device 150 capable of independently performing a data input/output operation. According to an embodiment, the region capable of independently performing a data input/output operation may be replaced with a unit or a component which is larger or smaller than a die. For example, when a data input/output operation is independently performed in a unit of planes or each plane supports an interleaving mode, the read task can be divided based on a unit of planes.

The controller 130 may determine whether there is an available resource (operation 416). If there is no available resource (NO in operation 416), the unit operation may be placed in a pending state (operation 420). As an example of placing the unit operation in the pending state, data or information corresponding to the unit operation can be transmitted to the pending queue 188 as described with reference to FIG. 1. If there is an available resource (YES in operation 416), the controller 130 may allocate the resource for a unit operation (operation 418).

The controller 130 can quantify or digitize status information regarding a first unit operation being performed in each die (operation 422). Thereafter, the controller 130 can quantify or digitize status information for a second unit operation scheduled to be performed in each die (operation 424). The first and second unit operations being performed or scheduled to be performed in each die may be given different weights depending on a type of unit operation. Herein, a weight may be determined based on resources spent on performing each unit operation.

After quantifying the status information based on the first unit operation being performed in each die and the second unit operation scheduled to be performed in each die, the controller 130 can determine which die can perform a unit operation first based on the quantified status information (operation 426). According to an embodiment, the controller 130 may compare the quantified status information with a reference. When the status information is lower than the reference (YES in operation 426), the controller 130 may assign a unit operation to the corresponding die (operation 428). However, if the status information is higher than the reference (NO in operation 426), the controller 130 might not assign the unit operation to the corresponding die and the unit operation can be in a pending state (operation 420). For example, status information of a first die is 30 and status information of a second die is 10. When a reference is 20, a new unit operation may not be assigned to the first die and a new unit operation can be assigned to the second die. Before a unit operation is assigned to a specific die (operation 428), at least one available resource should be allocated for the unit operation (operation 418).

Referring to FIGS. 7 and 8, the controller 130 may improve data input/output performance of the memory system by assigning data input/output operations based on available resource information and status information of the memory device 150. According to an embodiment, operations for collecting and determining the available resource information and the status information of the memory device 150 and determining whether a unit operation is assigned can be performed sequentially or in parallel in the memory system 110. Also, in a process of determining whether to assign the unit operation, the execution order of the unit operations may be changed or adjusted based on the status information of the memory device 150.

Figure 9:
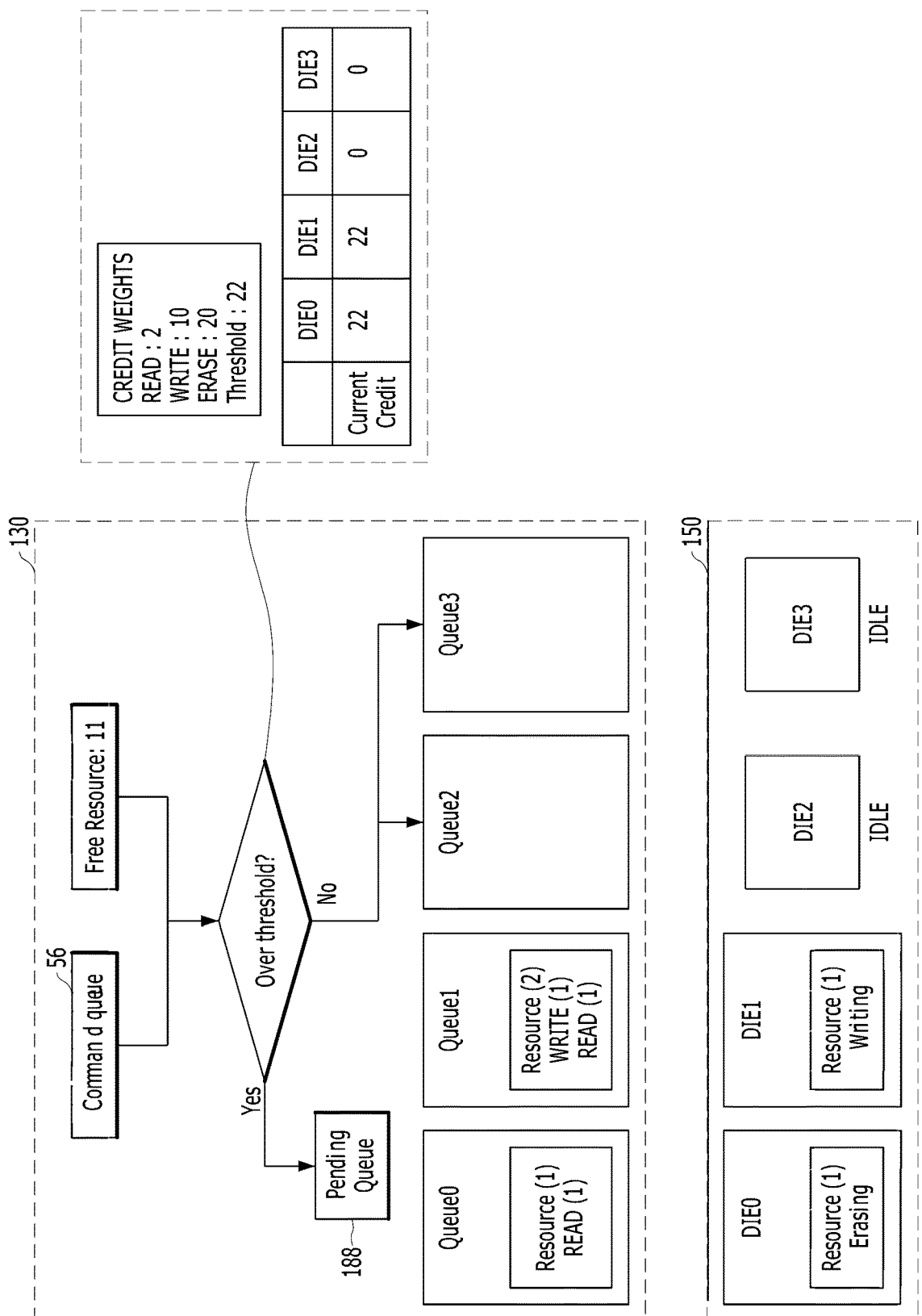
FIG. 9 illustrates a management of data input/output operations performed in a memory system according to an embodiment of the present disclosure.

FIG. 9 illustrates a management of data input/output operations performed in a memory system according to an embodiment of the present disclosure.

Referring to FIG. 9, a plurality of dies DIE0 to DIE3 in the memory device 150 can correspond to the plurality of memory groups 162, 164, 166, which can independently perform data input/output operations (see FIG. 1). The plurality of queues Queue0 to Queue3 in the controller 130 and the plurality of dies DIE0 to DIE3 in the memory device 150 may correspond one-to-one.

A first erase operation is performed in a first die DIE0 and one resource is allocated for the first erase operation. A first program (write) operation is performed on a second die DIE1 and one resource is allocated for the first program (writing) operation. On the other hand, there is no operation being performed in the third and fourth dies DIE2, DIE3, and the third and fourth dies DIE2, DIE3 are currently in an idle state. Also, referring to the plurality of queues Queue0 to Queue3 including unit operations scheduled to be performed in the plurality of dies DIE0 to DIE3, one first read operation is assigned to the first queue Queue0 and one resource is allocated for the first read operation. One second program (write) operation and one second read operation are assigned to the second queue Queue1, and two resources are allocated for the second program operation and the second read operation. On the other hand, no operation may be included in the third and fourth queues Queue2, Queue3 and no resources may be allocated for the third and fourth dies DIE2, DIE3.

If the total number of resources that the controller 130 can allocate is 16, the number of available resources ("Free Resource") is 11. That is, 5 resources among the 16 resources are allocated to the first and second dies DIE0, DIE1 and the first and second queues Queue0, Queue1 corresponding to the first and second dies DIE0, DIE1. The remaining 11 resources are available.

The controller 130 can determine status information regarding the plurality of dies DIE0 to DIE3. Here, a weight may be assigned to each unit operation. For example, different weights of 2 for a read operation, 10 for a program (write) operation, and 20 for an erase operation are individually given, and a threshold (reference) for determining status information is 22.

In the first die DIE0, because an erase operation is being performed and a read operation is scheduled to be performed, the numerical value of the status information is 22 (=20×1+2×1). Further, because the first program (write) operation is being performed on the second die DIE1 and the second program and read operations are scheduled to be performed, the numerical value of the status information is 22 (=10×2+2×1). When the quantified status information of the first die DIE0 and the second die DIE1 can be compared with the threshold (reference), the status information can be equal to or greater than the reference. In this case, the controller 130 might not assign any more unit operations to the first die DIE0 and the second die DIE1.

When some unit operations transmitted from the command queue 56 should be performed in the first die DIE0 and the second die DIE1, the controller 130 may transmit the corresponding unit operations to the pending queue 188. Through this operation, the controller 130 might not waste resources and can maintain 11 available resources. Further, if other unit operations corresponding to another command output from the command queue 56 can be performed in the third die DIE2 or the fourth die DIE3 instead of the first die DIE0 and the second die DIE1, the controller 130 may allocate available resources for the other unit operations and assign the other unit operations to the third group queue Queue2 or the fourth group queue Queue3 corresponding to the third die DIE2 or the fourth die DIE3.

Referring to FIGS. 5 and 9, the controller 130 can efficiently manage data input/output operations performed in the memory system. In FIG. 5, actual execution time would be delayed due to previously assigned operations. Because the controller 130 has sequentially allocated resources for operations, a situation in which no more operation is assigned or performed in some areas of the memory device 150 may occur. However, in FIG. 9, operations scheduled to be performed in the plurality of dies DIE0 to DIE3 in the memory device 150 can be limited based on a reference and quantified status information. In an embodiment, it is possible to avoid a situation in which unit operations performed on a specific die must wait for completing other unit operations scheduled to be performed in another die, which resources are allocated for in advance. Accordingly, data input/output performance of the memory system 110 can be improved.

As above described, a memory system according to an embodiment of the present disclosure may improve data I/O performance while performing data I/O operations corresponding to commands transmitted from an external device.

In addition, the memory system according to an embodiment of the present disclosure can efficiently allocate or manage resources, used in a process of performing data input/output operations, and can suppress unnecessary resource consumption to improve data input/output performance of the memory system.

Further, the memory system according to an embodiment of the present disclosure may estimate or predict which operation may take a long time to be completely performed or how long an operation is completely performed, so that the memory system can notify back an expected completion time regarding a data input/output operation to an external device.

While the present teachings have been illustrated and described with respect to the specific embodiments, it will be apparent to those skilled in the art in light of the present disclosure that various changes and modifications may be made without departing from the spirit and scope of the disclosure as defined in the following claims. Furthermore, the embodiments may be combined to form additional embodiments.

What is claimed is:

1. A memory system, comprising:
   a plurality of memory groups capable of performing a data input/output operation; and
   a controller configured to:
   divide an operation subject to a data input/output command into at least one unit operation corresponding to the plurality of memory groups, and
   assign the at least one unit operation to plural queues corresponding to the respective memory groups, based on first information regarding operation statuses of the plurality of memory groups and second information regarding available resources,
   wherein the controller is further configured to determine the first information based on at least one first unit operation being performed in the plurality of memory groups and at least one second unit operation which is assigned to the plurality of memory groups and included in the plural queues.

2. The memory system according to claim 1, wherein the controller determines the first information by:
   assigning different weights to the at least one first unit operation and the at least one second unit operation according to a type of unit operation,
   scoring operational burdens for the respective memory groups based on the weights assigned to the at least one first unit operation and the at least one second unit operation, and
   comparing the scored operational burdens with a reference.

3. The memory system according to claim 1,
   wherein each of the plurality of memory groups comprises plural non-volatile memory cells storing a data item and a buffer memory for temporarily storing the data item, and
   wherein each of the plurality of memory groups independently performs the at least one unit operation in an interleaving mode.

4. The memory system according to claim 1, wherein the controller is configured to adjust or change an assignment sequence of the at least one unit operation, based on the first information and the second information, before assigning the at least one unit operation to the plural queues.

5. A memory system, comprising:
   a plurality of memory groups capable of performing a data input/output operation; and
   a controller configured to:
   divide an operation subject to a data input/output command into at least one unit operation corresponding to the plurality of memory groups,
   assign the at least one unit operation to plural queues corresponding to the respective memory groups, based on first information regarding operation statuses of the plurality of memory groups and second information regarding available resources, and
   allocate at least one resource for the at least one unit operation,
   wherein, when a quantity of unit operations is greater than a quantity of resources, the controller is configured to assign the at least one unit operation to a pending queue which is distinguishable from the plural queues.

6. The memory system according to claim 5, wherein the quantity of resources is equal to a quantity of metadata for data input/output, which is allocated by a flash translation layer or a flash interface layer included in the controller.

7. The memory system according to claim 5, wherein the quantity of resources is equal to a quantity of threads which the controller is capable of controlling.

8. A method for operating a memory system, the method comprising:
   dividing an operation subject to a data input/output command into at least one unit operation corresponding to a plurality of memory groups;
   determining first information regarding operation statuses of the plurality of memory groups, based on at least one first unit operation being performed in the plurality of memory groups and at least one second unit operation which is assigned to the plurality of memory groups and included in plural queues; and
   assigning the at least one unit operation to the plural queues corresponding to the respective memory groups, based on second information regarding available resources and the first information.

9. The method according to claim 8, wherein the determining the first information comprises:
   assigning different weights to the at least one first unit operation and the at least one second unit operation according to a type of unit operation;
   scoring operational burdens for the respective memory groups based on the weights assigned to the at least one first unit operation and the at least one second unit operation; and
   comparing the scored operational burdens with a reference.

10. The method according to claim 8, wherein the at least one unit operation is independently performed by each of the plurality of memory groups in an interleaving mode.

11. The method according to claim 8, wherein the at least one unit operation is unassigned to the plural queues when a quantity of unit operations is greater than a quantity of resources.

12. The method according to claim 11, further comprising assigning the unassigned unit operation to a pending queue.

13. The method according to claim 8, further comprising adjusting or changing an assignment sequence of the at least one unit operation based on the first information and the second information, before assigning the at least one unit operation to the plural queues.

14. A controller in communication with a plurality of memory groups, which are capable of performing a data input/output operation via plural data paths, the controller comprising at least one processor, at least one memory and a logic, at least a portion of the logic comprised in hardware,
wherein the logic is configured to:
establish, in the at least one memory, a first region for temporarily storing first operation data regarding an operation subject to a command input from an external device and a second region for temporarily storing second operation data regarding at least one second unit operation scheduled to be performed in the plurality of memory groups; and
generate the second operation data from the first operation data, based on second information regarding available resources and first information regarding operation statuses of the plurality of memory groups,
wherein the logic is further configured to determine the first information based on at least one first unit operation being performed in the plurality of memory groups and at least one second unit operation of the second operation data stored in the second region and included in the plural queues.

15. The controller according to claim 14, wherein the logic determines the first information by:
assigning different weights to the at least one first unit operation and the at least one second unit operation according to a type of unit operation,
scoring operational burdens for the respective memory groups based on the weights assigned to the at least one first unit operation and the at least one second unit operation, and
comparing the scored operational burdens with a reference.

16. The controller according to claim 14, wherein the logic is further configured to:
establish, in the at least one memory, a third region for temporarily storing third operation data regarding at least one pending operation or at least one pending unit operation which is not included in the second operation data; and
generate the third operation data from the first operation information, based on the first and second information.

17. The controller according to claim 16, wherein the logic is further configured to adjust or change a sequence of the second operation data or the third operation data while generating the second operation data to be stored in the second region or the third operation data to be stored in the third region based on the first operation data stored in the first region.

* * * * *